(12) United States Patent
Park et al.

(10) Patent No.: US 12,027,115 B2
(45) Date of Patent: Jul. 2, 2024

(54) LARGE-AREA DISPLAY DEVICE AND LARGE-AREA DISPLAY DEVICE DRIVING SYSTEM

(71) Applicant: LG Display Co., Ltd., Seoul (KR)

(72) Inventors: JongJin Park, Gwacheon-si (KR); ByeongHyeon Na, Seoul (KR); Jungwon Ryu, Seoul (KR); Hankyeol Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/983,996

(22) Filed: Nov. 9, 2022

(65) Prior Publication Data

US 2023/0154398 A1    May 18, 2023

(30) Foreign Application Priority Data

Nov. 12, 2021 (KR) .................. 10-2021-0155657

(51) Int. Cl.
*G09G 3/3225* (2016.01)

(52) U.S. Cl.
CPC ..... *G09G 3/3225* (2013.01); *G09G 2300/023* (2013.01); *G09G 2300/026* (2013.01);
(Continued)

(58) Field of Classification Search
CPC ........ G09G 3/3225; G09G 3/035; G09G 3/20; G09G 3/2074; G09G 3/3266; G09G 3/3275; G09G 2300/023; G09G 2300/026; G09G 2300/0426; G09G 2300/0452; G09G 2300/0804; G09G 2300/0408; G09G 2300/0439; G09G 2320/045; G09G 2320/0233; G09G 2320/043; G09G 2310/0232; G09G 2340/0407; G09G 2380/02; G06F 3/1446
See application file for complete search history.

(56) References Cited

U.S. PATENT DOCUMENTS

| | | | |
|---|---|---|---|
| 6,480,175 B1 * | 11/2002 | Schneider | H04N 9/12 348/E17.005 |
| 2004/0014252 A1 * | 1/2004 | Shimoda | G09F 9/313 438/22 |

(Continued)

FOREIGN PATENT DOCUMENTS

| | | |
|---|---|---|
| JP | 2001-100662 A | 4/2001 |
| JP | 2005-17738 A | 1/2005 |

(Continued)

*Primary Examiner* — Christopher E Leiby
(74) *Attorney, Agent, or Firm* — Birch, Stewart, Kolasch & Birch, LLP

(57) ABSTRACT

A large-area display device can include a first individual display device including a plurality of first pixels, and a second individual display device including a plurality of second pixels and overlapping with the first individual display device in an overlapping area. The first individual display device is configured to be driven so that one or more pixels among the plurality of first pixels that are overlapped by the second individual display device in the overlapping area do not display an image, and the second individual display device is configured to drive one or more pixels among the plurality of second pixels located in the overlapping area to display an image.

21 Claims, 18 Drawing Sheets

(52) U.S. Cl.
CPC ............... *G09G 2300/0426* (2013.01); *G09G 2300/0452* (2013.01); *G09G 2300/0804* (2013.01); *G09G 2320/045* (2013.01)

(56) References Cited

U.S. PATENT DOCUMENTS

| | | | |
|---|---|---|---|
| 2005/0185114 A1* | 8/2005 | Cok | G02B 6/06 |
| | | | 349/73 |
| 2005/0285811 A1* | 12/2005 | Kawase | G02F 1/13336 |
| | | | 345/1.1 |
| 2010/0321276 A1 | 12/2010 | Templier et al. | |
| 2011/0057861 A1* | 3/2011 | Cok | H10K 59/18 |
| | | | 345/1.3 |
| 2012/0026211 A1 | 2/2012 | Kikuchi et al. | |
| 2015/0277173 A1* | 10/2015 | Jung | G02F 1/133603 |
| | | | 349/69 |
| 2016/0037608 A1* | 2/2016 | Ikeda | H05B 33/12 |
| | | | 362/235 |
| 2016/0103649 A1* | 4/2016 | Yoshitani | H10K 59/18 |
| | | | 345/694 |
| 2016/0132281 A1 | 5/2016 | Yamazaki et al. | |
| 2016/0210103 A1* | 7/2016 | Yoshizumi | H01L 27/14681 |
| 2017/0090260 A1* | 3/2017 | Yu | G02F 1/13336 |
| 2018/0284529 A1 | 10/2018 | Sato et al. | |
| 2019/0102136 A1 | 4/2019 | Yoshitani et al. | |
| 2020/0058730 A1* | 2/2020 | Ha | H05K 5/0021 |
| 2020/0185460 A1* | 6/2020 | Liu | G09G 3/32 |
| 2020/0205305 A1 | 6/2020 | Kim | |
| 2021/0004193 A1 | 1/2021 | Yamazaki et al. | |
| 2021/0159461 A1 | 5/2021 | Nakamura et al. | |
| 2021/0202906 A1 | 7/2021 | Kim et al. | |
| 2022/0037296 A1* | 2/2022 | Yeon | H01L 25/167 |
| 2022/0085098 A1* | 3/2022 | Kim | H01L 25/0753 |
| 2022/0199874 A1* | 6/2022 | Ko | H01L 27/156 |
| 2022/0208864 A1* | 6/2022 | Kim | H10K 50/80 |
| 2022/0299812 A1* | 9/2022 | Wu | G02F 1/133388 |

FOREIGN PATENT DOCUMENTS

| | | |
|---|---|---|
| JP | 2011-8255 A | 1/2011 |
| JP | 2012-27405 A | 2/2012 |
| JP | 2012-109664 A | 6/2012 |
| JP | 2013-156452 A | 8/2013 |
| JP | 2016-95502 A | 5/2016 |
| JP | 2016-167049 A | 9/2016 |
| JP | 2018-167045 A | 9/2016 |
| JP | 2018-180017 A | 11/2018 |
| JP | 2020-30318 A | 2/2020 |
| KR | 10-2017-0080962 A | 7/2017 |
| KR | 10-2020-0079841 A | 7/2020 |
| WO | WO 2014/192398 A1 | 12/2014 |
| WO | WO 2019/038619 A1 | 2/2019 |

* cited by examiner

LARGE-AREA DISPLAY DEVICE AND LARGE-AREA DISPLAY DEVICE DRIVING SYSTEM

CROSS REFERENCE TO RELATED APPLICATION

This application claims priority to Korean Patent Application No. 10-2021-0155657, filed in the Republic of Korea on Nov. 12, 2021, the entirety of which is hereby incorporated by reference for all purposes as if fully set forth herein.

BACKGROUND

Technical Field

Embodiments of the present disclosure relate to a large-area display device and a large-area display device driving system.

Discussion of the Background Art

As the information society develops even further, there is increasing demand for a display device for displaying an image in various forms, and various display devices, such as a liquid crystal display device and an organic light emitting display device are utilized.

Meanwhile, a large display device may be required for commercial purposes, etc. However, according to the present technology, since there is a limit to the size of a display panel for implementing a display device, there is used a large-area display device that displays a single image by connecting together a plurality of display panels or individual display devices to implement a large display device. Such a large-area display device may be also referred as a video wall or the like.

Meanwhile, each display panel or individual display device within such a large-area display device includes a display area displaying an image and a non-display area, which is disposed around the display area and does not display an image. However, this can cause a problem in that a viewer will see a lattice or grid when looking at the large-area display device due to the non-display area in each of the individual display devices that make up the large-area display device.

The non-display area has a kind of frame shape formed to have a constant width while surrounding the edge of the display panel. The non-display area may be expressed as a bezel area.

A driving circuit for driving the display panel is located in the non-display area or the bezel area. For example, a gate driving circuit, a data driving circuit, and/or various signal lines for driving the display panel may be positioned in the bezel area.

Recently, there has been conducted the research for realizing a narrow bezel by minimizing such a bezel area in a display device, but there is a limit to realizing the width of the bezel area to a certain size or less.

In the situation of a general large-area display device, since a plurality of individual display devices are connected to each other, the bezel area of the individual display device is double arranged at the connection part of the individual display device. Therefore, the non-display area is more easily recognized in the connection portion of the individual display devices. For this reason, if a single image is displayed on a large-area display device, there is a problem in that the image is recognized as discontinuous in the connection part, and the viewer will see a noticeable grid or lattice pattern, which distracts from the displayed image and impairs image quality and aesthetics.

That is, in the situation of a large-area display device implemented by connecting together a plurality of individual display devices, except for ideally implementing a zero bezel, there is a problem in that an image discontinuity occurs in a seam area which is a connection portion of individual display devices. Therefore, there is a demand for solving this problem.

SUMMARY OF THE DISCLOSURE

Embodiments of the present disclosure can provide a large-area display device and a large-area display device driving system in which it is recognized that the images are continuously displayed in the area where the individual display devices are overlapped.

Embodiments of the present disclosure can provide a large-area display device including a first individual display device including a plurality of pixels, and a second individual display device including a plurality of pixels and overlapping the first individual display device in an overlapping area, in which the first individual display device is driven so that pixels located in the overlapping area among the plurality of pixels do not display an image, and the second individual display device drives pixels located in the overlapping area among the plurality of pixels to display an image.

Embodiments of the present disclosure can provide a large-area display device driving system including a large-area display device in which a plurality of detachable individual display devices are disposed to be overlapped with each other, an individual display device position adjusting member configured to fix a position of each of the plurality of detachable individual display devices, and a horizontal frame on which the individual display device position adjusting member is mounted.

According to embodiments of the present disclosure, it is possible to provide a large-area display device and a large-area display device driving system in which it is recognized that the images are continuously displayed in the area where the individual display devices are overlapped, such that there is no discontinuity or grid pattern seen by a viewer.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure. In the drawings.

DETAILED DESCRIPTION OF THE EMBODIMENTS

Figure 1:
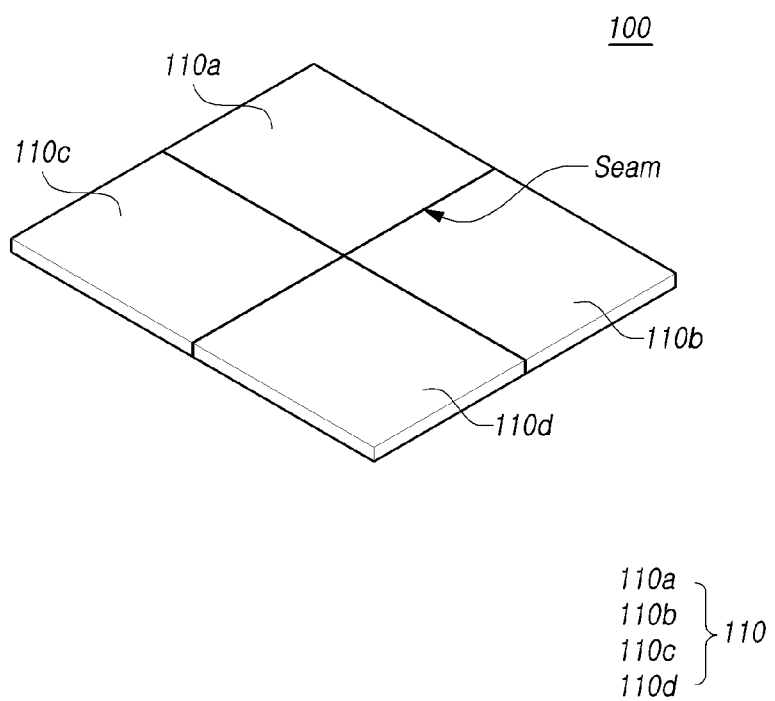
FIG. 1 illustrates an example of a large-area display device as a comparative example.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to," "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc. each other via a fourth element. Here, the second element may be included in at least one of two or more elements that "are connected or coupled to," "contact or overlap," etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Hereinafter, various embodiments of the present disclosure will be described in detail with reference to the accompanying drawings.

FIG. 1 illustrates an example of a large-area display device 100.

Referring to FIG. 1, a large-area display device 100 can include n individual display devices 110 (where n is an integer greater than or equal to 2). The individual display devices 110 can be arranged side by side on a plane as shown in FIG. 1, or at least a portion of two or more individual display devices can be arranged to overlap each other, unlike shown in FIG. 1.

Referring to FIG. 1, the large-area display device 100 can include a plurality of individual display devices 110. The large-area display device 100 can have a 1×N structure in which two or more individual display devices 110 are disposed in one row (where N is an integer of 2 or more). The large-area display device 100 can have an N×1 structure in which two or more individual display devices 110 are disposed in one column. The large-area display device 100 can have an N×M structure in which a plurality of individual display devices 110 are arranged in a matrix form having two or more rows and two or more columns (where M is an integer of 2 or more). For example, the large-area display device 100 can include an upper left individual display device 110*a*, an upper right individual display device 110*b*, and a lower left individual display device 110*c*, and a lower right individual display device 110*d*.

The individual display devices 110 can be arranged side by side on a plane, however, the lower left individual display device 110*c* can overlap at least a portion of the upper left individual display device 110*a*, or the upper right individual display device 110*b* can be disposed to overlap at least a portion of the upper left individual display device 110*a*.

In the drawings, it is illustrated as an example a situation in which the large-area display device 100 includes four individual display devices 110, but the present disclosure is not limited thereto. In addition, although the individual display devices 110 constituting the large-area display device 100 have substantially the same area and shape in the drawings as an example, the present disclosure is not limited thereto.

The large-area display device 100 can provide a single image to the user through the individual display devices 110*a*-110*d*. A user can recognize one piece of image information provided from the large-area display device 100 through a large screen corresponding to the combined area of the individual display devices 110. If necessary, the large-area display device 100 can provide a plurality of different images through the individual display devices 110.

Each of the individual display devices 110 can include an organic light emitting diode (OLED).

Meanwhile, referring to FIG. 1, in the large-area display device 100, bezel areas of the individual display devices 110 are disposed adjacent to each other in the region where the individual display devices 110 are connected, so that the non-display area NA is relatively more easily recognized.

In the large-area display device 100, a region in which the individual display devices 110 are connected to each other can be referred to as a seam area or a seam region. There may occur an image discontinuity phenomenon in such a seam area, which can distract from a user's view of the overall displayed image and impair image quality.

Figure 2:
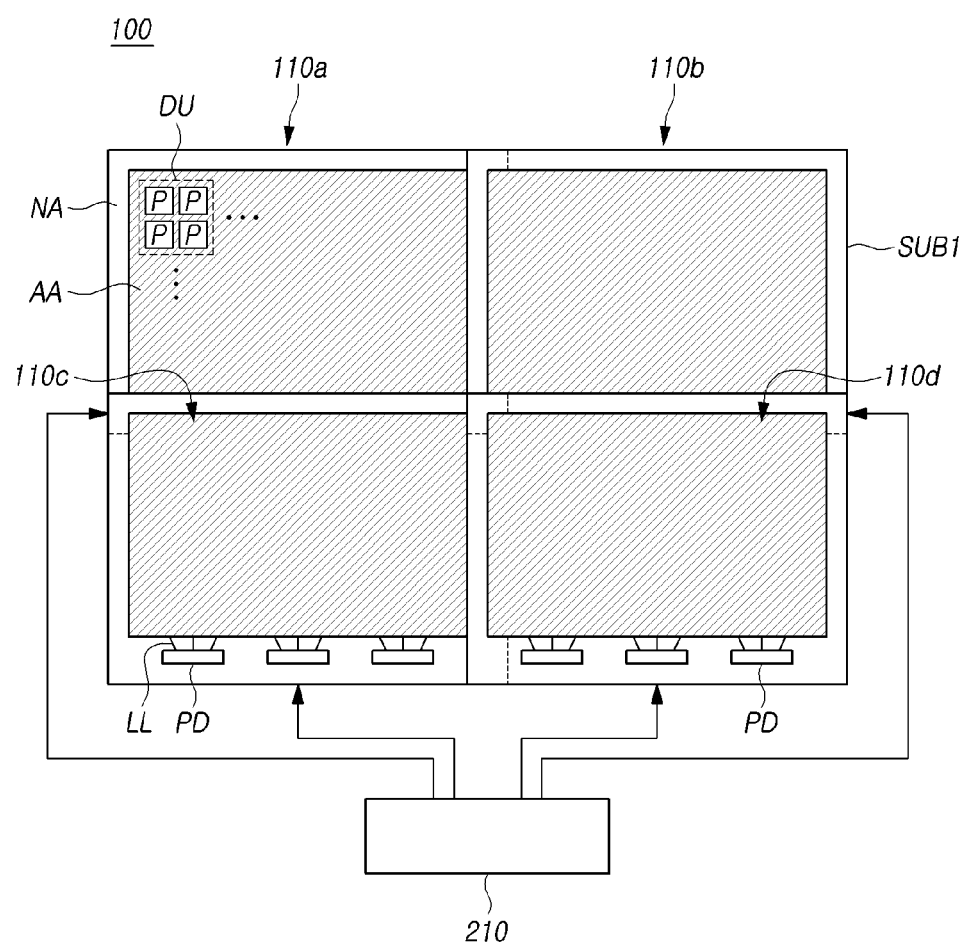
FIG. 2 schematically illustrates a large-area display device according to embodiments of the present disclosure.

FIG. 2 schematically illustrates a large-area display device 100 according to embodiments of the present disclosure.

Each of the individual display devices 110 can include a first substrate SUB1 and a driving circuit. A display area AA and a non-display area NA around the display area AA are defined on the first substrate SUB1. The non-display area NA is also referred to as a bezel area. The first substrate SUB1 can be formed of a plastic material, such as polyimide (PI), polyethylene terephthalate (PET), polyethylenenaphthalate (PEN), or polycarbonate (PC), and can have flexible characteristics.

A plurality of pixels P can be arranged on the upper surface of the display area AA of the first substrate SUB1. The individual display device 110 can further include an encapsulation layer. The encapsulation layer can be disposed to cover the display area AA, and can serve to protect elements in the pixel P from moisture and oxygen which can be introduced from the outside.

The pixel P can include a plurality of sub-pixels SP. Each of the sub-pixels SP can include an organic light emitting diode emitting a corresponding color. The sub-pixel SP can be implemented using an active matrix (AM) method or a passive matrix (PM) method. Hereinafter, for convenience of description, it will be described as an example a situation in which the sub-pixel SP is implemented in the active matrix method including a transistor. The organic light emitting diode and the transistor can be driven while being electrically connected to signal lines for applying a predetermined signal.

A pad portion can be positioned in the non-display area NA of the first substrate SUB1. The pad portion can include a plurality of pads PD and link lines LL.

The pads PD are respectively connected through link lines LL to signal lines of the display area AA. The link line LL is electrically connected to a driver through the pad PD, receives a driving signal, and transmits it to the signal line of the display area AA.

The driving unit can include a circuit board. The circuit board can be disposed on the rear side of the first substrate SUB1. A driving IC chip can be mounted on the circuit board.

In another embodiment, the driver can be positioned on at least one side of the non-display area NA of the first substrate SUB1. In this situation, in the first substrate SUB1, the driver can be positioned in a wide bezel area. One side of the first substrate SUB1 on which the driver is positioned can be a wide bezel area, and the other side on which the driver is not positioned can be a narrow bezel area.

Each of the individual display devices 110 according to embodiments of the present disclosure can have a driving unit DU composed of two or more pixels P.

The driving unit DU can be composed of two or more pixels P, and during an image display period, only one pixel P among the pixels P included in the driving unit DU displays an image, and the remaining pixels P do not display an image.

In the large-area display device 100 according to embodiments of the present disclosure, a width of a bezel area can be smaller than a distance between pixels P driven in two adjacent driving units DU. Accordingly, an image discontinuity problem can be prevented from occurring in a region where the two individual display devices 110 are connected to each other.

Furthermore, the large-area display device 100 according to embodiments of the present disclosure can have a structure in which each of the individual display devices 110 is separable. For example, different individual display devices 110 can be mixed and matched, and connected together to form a large display device of various sizes and shapes.

The individual display devices 110 can freely implement an embodiment having a different stacked structure, and the pixels P driven by the driving unit DU can be set differently according to the stacked structure.

It will be described later a specific embodiment in which the driving of the pixel P in the driving unit DU varies according to the stacked structure of the individual display devices 110 with reference to FIGS. 5 and 6.

The large-area display device 100 according to embodiments of the present disclosure can drive only one pixel P among the pixels P included in the driving unit DU when driving an image display. Accordingly, the lifespan of the large-area display device 100 according to the embodiments of the present disclosure can be more than twice that of the large-area display device having an embodiment in which all pixels P are used to display an image.

The large-area display device 100 according to the embodiments of the present disclosure can further include an integrated controller 210 for differently setting the driving unit DU according to the stacked structure of the individual display devices 110.

The driving unit of the individual display devices 110 can drive only one pixel P among the pixels P included in the driving unit DU under the control of the integrated controller 210.

In the driving unit DU, while one pixel P displays an image, the remaining pixels P do not display an image. For example, when two pixels P from two different individual display devices 110 overlap with each other, a coordinated control can be provided so that only one of the double stacked pixels P emits light for the image.

Referring to FIG. 2, in the large-area display device 100 according to embodiments of the present disclosure, at least a portion of two or more individual display devices 110 can overlap each other.

In the large-area display device 100 shown in FIG. 2, an upper left individual display device 110a is disposed at the bottom, and a right-up sided individual display device 110b is disposed on the upper left individual display device 110a, a lower left individual display device 110c is disposed on the upper right individual display device 110b, and a lower right individual display device 110d is disposed on the lower left individual display device 110c.

With respect to the two individual display devices 110 overlapping with each other, the individual display device 110 positioned on the upper side can overlap at least a portion of the display area AA of the individual display device 110 positioned on the lower side (e.g., underneath).

Referring to FIG. 2, the upper right individual display device 110*b* positioned to overlap at least a portion of the upper left individual display device 110*a* can be disposed to overlap at least a portion of the display area AA of the upper left individual display device 110*a*.

Similarly, the lower left individual display device 110*c* positioned to overlap at least a part of the upper left individual display device 110*a* can be disposed to overlap at least a portion of the display area AA of the upper left individual display device 110*a*.

Accordingly, with respect to the two individual display devices 110 overlapping with each other, the non-display area NA of the individual display device 110 positioned on the upper side can be positioned on the display area AA of the individual display device 110 positioned on the lower side (e.g., underneath).

For example, the bezel area of the lower left individual display device 110*c* can be positioned to overlap the display area AA of the upper left individual display device 110*a*.

Referring to FIG. 2, each of the individual display devices 110 can include at least three narrow bezel sides. In some situations, the individual display devices 110 can include one wide bezel side.

In FIG. 2, there is disclosed an embodiment in which each of the individual display devices 110 includes three narrow bezel sides and one wide bezel side.

Two or more pads PD and link lines LL can be positioned on a surface on which a wide bezel is positioned in the individual display device 110. The driving unit DU of the individual display device 110 can be located on the rear side of the individual display device 110 by being connected to the pads PD on the side on which the wide bezel is positioned.

Figure 3:
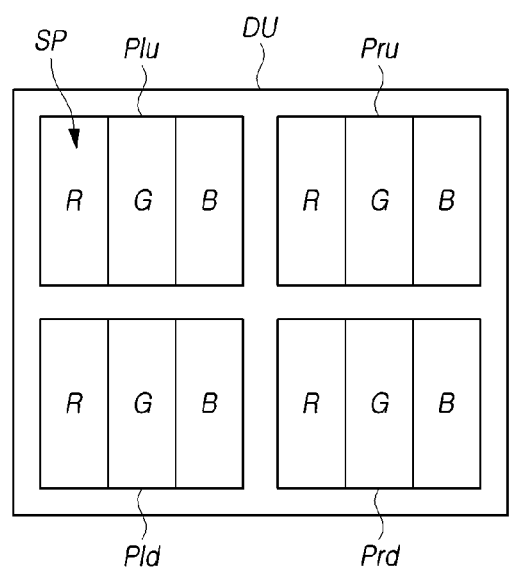
FIG. 3 illustrates a driving unit according to embodiments of the present disclosure.

FIG. 3 illustrates a driving unit DU according to embodiments of the present disclosure.

Referring to FIG. 3, the driving unit DU according to embodiments of the present disclosure can include pixels P arranged in a matrix structure of two rows and two columns or more.

The pixel P can include two or more sub-pixels SP. In the drawings, it is illustrated as an example a situation in which the pixel P includes sub-pixels SP of red (R), green (G), and blue (B) sequentially arranged in one direction, however, the present invention is not limited thereto. For example, the pixel P can include red (R), blue (B), green (G), and white (W) sub-pixels SP. The arrangement order of the sub-pixels SP can be variously changed depending on the light emitting material, the light emitting area, the configuration of the compensation circuit, and the like.

Referring to FIG. 3, one driving unit DU can include an upper left pixel Plu positioned at the upper left side, and an upper right pixel Pru positioned at the upper right side, a lower left pixel Pld positioned at the lower left side, and a lower right pixel Prd positioned at the lower right side.

In the large-area display device 100 according to embodiments of the present disclosure, only the upper left pixel Plu, only the upper right pixel Pru, only the lower left pixel Pld, or only the lower right pixel Prd can be driven to display the image (e.g., one of the four pixels P can be driven at a time, thus preserving the lifespan of the other three pixels P to be used at a different time, if desired).

Figure 4:
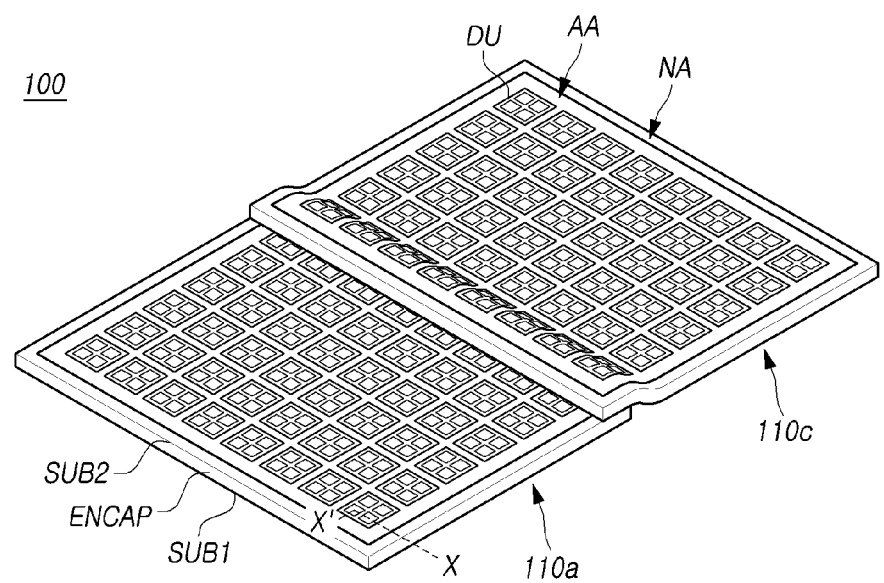
FIG. 4 illustrates a state in which individual display devices are overlapped and disposed in a large-area display device according to embodiments of the present disclosure.

FIG. 4 illustrates a state in which individual display devices 110 are overlapped and disposed in a large-area display device 100 according to embodiments of the present disclosure.

Referring to FIG. 4, the upper left individual display device 110*a* and the lower left individual display device 110*c* can be disposed to overlap with each other.

Each individual display device 110 can include a first substrate SUB1, a second substrate SUB2 positioned opposite to the first substrate SUB1, and an encapsulation layer ENCAP between the first substrate SUB1 and the second substrate SUB2.

A light blocking layer configured to distinguish sub-pixels can be positioned on the second substrate SUB2. In some situations, a color filter, a polarizing plate, etc. can be further positioned on the second substrate SUB2.

Preferably, the first substrate SUB1 and the second substrate SUB2 are flexible substrates with flexible characteristics. It is preferable that the second substrate SUB2 has a high light transmittance to visible light.

It is preferable that the first substrate SUB1 and the second substrate SUB2 have a thinner thickness. As the thicknesses of the first substrate SUB1 and the second substrate SUB2 are thinner, the thickness of the individual display devices 110 becomes thinner, so that the step difference in the area where the individual display devices 110 overlap with each other can be reduced or minimized.

Referring to FIG. 4, in the situation that both the first substrate SUB1 and the second substrate SUB2 are flexible substrates, the individual display device 110 can have a curved surface in which a portion of the display area AA is curved. However, since the user of the large-area display device 100 views an image from a much farther distance away than that of a general display device, and the step can hardly be recognized because of the small thickness of the individual display device 110, the curved surface of the display area AA can be hardly recognized by a viewer.

Meanwhile, unlike the one shown in FIG. 4, two or more individual display devices 110 constituting the large-area display device 100 do not have a curved surface in which a portion of the display area AA is curved, but can be arranged in a flat stack.

For example, the lower left individual display device 110*c* can be disposed on the upper side of the upper left individual display device 110*a*, and the lower left individual display device 110*c* can have a flat bottom surface.

Accordingly, two or more individual display devices 110 can be sequentially stacked while maintaining a step corresponding to the thickness of each of the individual display devices 110. Accordingly, two or more individual display devices 110 can be stacked in a staircase-like shape to configure the large-area display device 100.

In this situation, the large-area display device 100 can include two or more individual display devices 110 disposed at an oblique angle with respect to the viewing surface of the large-area display device 100. Since a user of the large-area display device 100 views an image from a much further distance away than a general display device, the effect of a step difference due to the thickness of the individual display device 110 can largely be ignored since it is unlikely to be noticeable to a viewer anyways.

In addition, in some situations, viewers viewing the image displayed on the large-area display device 100 can view the image in different environments. For example, for each of the viewers, a viewing distance away from the large-area display device 100 can be different, a distance from the ground on which the large-area display device 100 is placed can be different, or a viewing angle of the large-area display device 100 can be different. Accordingly, even if the individual display devices 110 constituting the large-area display device 100 are placed at an oblique angle with respect to the viewing surface of the large-area display device 100, it can be a factor to increase the satisfaction of viewers in some environments.

Hereinafter, for convenience of description, it is assumed that the large-area display device 100 includes the individual display device 110 having a curved surface, but is not limited thereto.

In the large-area display device 100 according to another embodiment of the present disclosure, the second substrate SUB2 can be formed of a glass substrate. In this situation, even if the individual display devices 110 overlap each other, the user of the large-area display device 100 can hardly recognize the step difference due to the overlap of the individual display devices 110.

Referring to FIG. 4, a portion of the driving unit DU of the upper left individual display device 110a can be covered by the non-display area NA and the display area AA of the lower left individual display device 110c.

Specifically, among the driving units DU of the upper left individual display device 110a, in the driving unit DU positioned adjacent to the lower left individual display device 110c, half of the pixels P included in the driving unit can overlap the lower left individual display device 110c.

In one driving unit DU, pixels P positioned in the direction of the lower left individual display device 110c may not display an image. Similarly, in one driving unit DU, any one of the pixels P positioned in the direction of the upper left individual display device 110a displays an image. For example, the pixels P in the upper left individual display device 110a that are overlapped by the pixels P in the lower left individual display device 110c can be controlled so that they do not display the image (e.g., the pixels P disposed underneath the overlapped lip portion remain off), while the pixels P in the upper left individual display device 110a can be controlled to be turned on to display the image, or vice versa.

Figure 5:
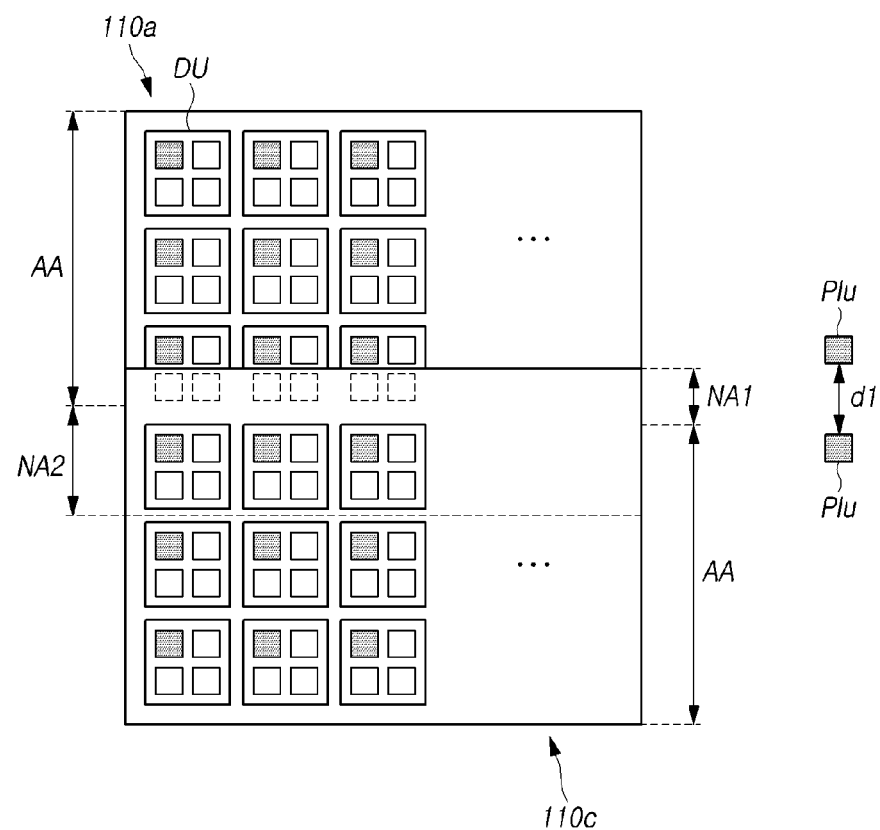
FIG. 5 is a diagram illustrating a principle in which a seam is not visually recognizable in a large-area display device according to embodiments of the present disclosure.

FIG. 5 is a diagram illustrating a principle in which a seam is not visually recognized by a user in a large-area display device according to embodiments of the present disclosure.

Referring to FIG. 5, the upper left individual display device 110a can be positioned to overlap the lower left individual display device 110c. The lower left individual display device 110c can be positioned to overlap a portion of the display area AA of the upper left individual display device 110a.

Meanwhile, a bezel having a first width NA1 is positioned on the upper left individual display device 110a. Here, the bezel of the first width NA1 can be the bezel of the lower left individual display device 110c. The first width NA1 is less than or equal to a distance d1 between pixels P displaying images in adjacent driving units DU (e.g., NA1≤d1). For example, a group four pixels P, each including three subpixels, can be arranged in one driving unit DU, which can have a square shape.

Referring to FIG. 5, the upper left pixel Plu of the driving unit DU displays an image, and the distance d1 between the upper left pixels Plu of the adjacent driving unit DU can be greater than or equal to the first width NA1. Accordingly, in a region where the upper left individual display device 110a and the lower left individual display device 110c overlap with each other, there may not occur any image discontinuity due to the bezel of the first width NA1 (e.g., a visually recognizable grid or lattice effect can be prevented).

Meanwhile, a bezel having the second width NA2 can be positioned underneath the lower left individual display device 110c. Here, the bezel of the second width NA2 can be the bezel of the upper left individual display device 110a.

The bezel of the second width NA2 can be a narrow bezel (e.g., NA2≤d1), but can also be a wide bezel (e.g., NA2>d1).

If the bezel of the second width NA2 is formed as a narrow bezel, the second width NA2 can be the same as the first width NA1 (e.g., NA2=NA1).

Here, the narrow bezel can refer to a situation in which the width of the bezel is equal to or smaller than the distance between the pixels P displaying images in the adjacent driving units DU. Conversely, the wide bezel can refer to a situation in which the width of the bezel is greater than the distance d between pixels P displaying images in adjacent driving units DU.

Since the narrow bezel is positioned on the pixel P that does not display an image, the user cannot recognize the seam. Also, the pixels P across the large size display can be evenly and uniformly spaced even in the areas where two individual display devices 110 overlap each other.

Meanwhile, in FIG. 5, the narrow bezel is shown to be positioned to overlap with the pixels P located in the outermost row (e.g., the lowermost row), but the narrow bezel can be located in an inner row than the outermost row (e.g. 3rd row from the bottom, etc.). That is, the narrow bezels can overlap inside the display area AA. In this situation, at least a portion of the display area AA of the upper left individual display device 110a and the display area AA of the lower left individual display device 110c can be positioned to overlap each other.

For example, in the situation that the narrow bezel is positioned in the third row from the bottom, among the pixels P positioned in the upper left individual display device 110a, the pixels P positioned in the third row from the bottom, the second row from the bottom, and the lowermost row can be positioned in the overlapping area. In this situation, among the pixels P of the upper left individual display device 110a, the pixels P positioned in the overlapping area overlapping the lower left individual display device 110c do not display an image. In such a structure, the narrow bezel can be located in more inner rows than the outermost rows (e.g., third row from the bottom, etc.). According to such a structure, the area of the overlapping region of the individual display devices 110 can be increased, and the individual display devices 110 can be more stably overlapped in the large-area display device 100, which can increase the strength of the large-area device 100.

In addition, narrow bezels can be located in more inner rows (e.g., third row from the bottom, fifth row, etc.) than the outermost row (e.g., lowermost row). That is, the area of the overlapping region in which the individual display devices 110 overlap each other can be freely selectable by a user who stacks the individual display devices 110. In this situation, a user who implements the large-area display device 100 by stacking the individual display devices 110 overlapping each other can freely select the area of the region in which the large-area display device 100 displays an image while preventing the seam from being recognized. According to this, even if the same number of individual display devices 110 are used, the area of the region in which the large-area display device 100 displays an image as a whole can be different. Accordingly, in the large-area display device 100, the total area of a region displaying an image can vary according to a usage environment and is freely adjustable to meet a user's needs.

Hereinafter, for convenience of description, it is assumed that the narrow bezel is positioned to overlap the pixels P positioned in the outermost row or outermost column. However, in the embodiments according to the present specification, the narrow bezel can be located to overlap the pixels P located in an inner row than the outermost row, or the narrow bezel can be located to overlap with pixels P located in an inner column than the outermost column.

Referring to FIG. 5, the pixel Plu displaying an image in the upper left individual display device 110a may not overlap the lower left individual display device 110c. In this situation, the light output from the upper left individual display device 110a does not pass through the substrate of the lower left individual display device 110c. Accordingly, the light emitted from the upper left individual display device 110a can reach the user without having to pass through another medium other than air. Accordingly, there can be further improved the visibility of the seam portion.

Figure 6:
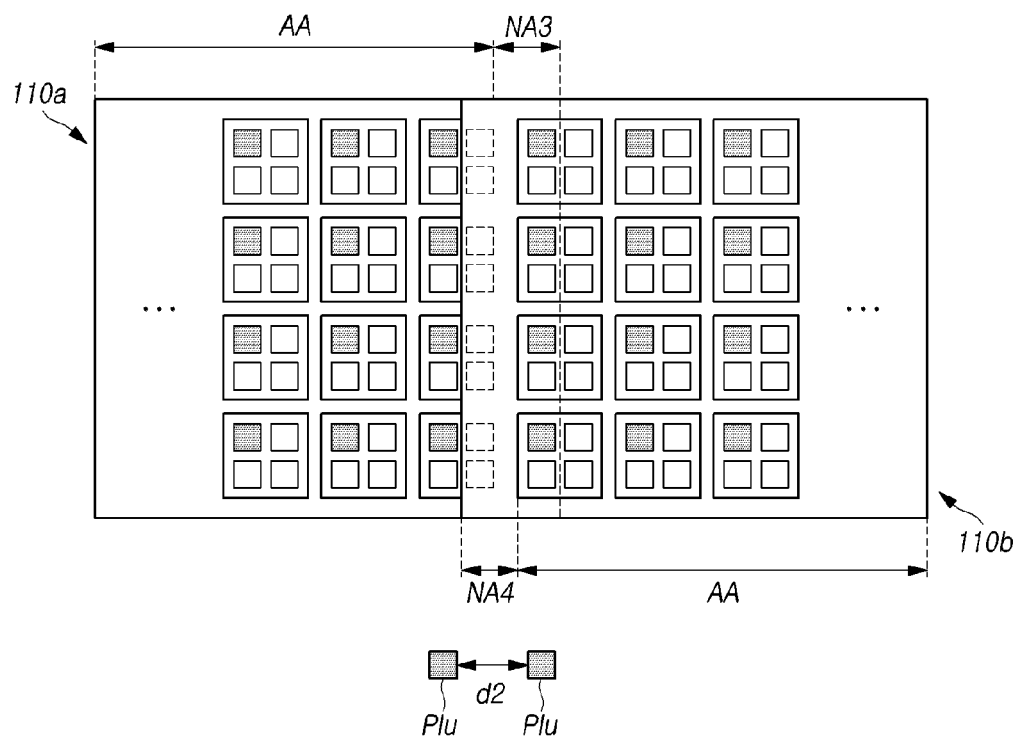
FIG. 6 is another diagram for explaining a principle in which a seam is not visually recognizable in a large-area display device according to embodiments of the present disclosure.

FIG. 6 is another diagram for explaining a principle in which a seam is not visually recognized in a large-area display device according to embodiments of the present disclosure.

Referring to FIG. 6, the upper left individual display device 110a is positioned to overlap the upper right individual display device 110b. The upper right individual display device 110b is positioned to overlap with a portion of the display area AA of the upper left individual display device 110a.

A bezel having a fourth width NA4 can be positioned on the upper left individual display device 110a. Here, the bezel of the fourth width NA4 can be the bezel of the upper right individual display device 110c. The fourth width NA4 can be less than or equal to a distance d2 between pixels P displaying images in adjacent driving units DU (e.g., NA4≤d2).

Referring to FIG. 6, the upper left pixel Plu of the driving unit DU displays an image, and the distance d2 between the upper left pixels Plu in the adjacent driving units DU can be greater than or equal to the fourth width NA4. Accordingly, in a region where the upper left individual display device 110a and the upper right individual display device 110b overlap each other, there may not occur any image discontinuity due to the bezel of the fourth width NA4.

A bezel having a third width NA3 can be positioned under the upper right individual display device 110b. Here, the bezel of the third width NA3 can be the bezel of the upper left individual display device 110a.

The bezel of the third width NA3 can be a narrow bezel (e.g., NA3≤d2), but can also be a wide bezel (e.g., NA3>d2).

In the situation that the bezel of the third width NA3 is formed as a narrow bezel, the third width NA3 can be the same as the fourth width NA4 (e.g., NA3=NA4).

All of the bezels of the first to fourth widths NA1 to NA4 can be narrow bezels, and any one of the bezels can be wide bezels.

Hereinafter, for convenience of explanation, it is assumed that the bezel of the first width NA1, the bezel of the second width NA2, the bezel of the third width NA3, and the bezel of the fourth width NA4 are all narrow bezels.

FIGS. 7 to 10 illustrate configurations in which pixels P emitting light in a driving unit DU are driven differently according to the order in which four individual display devices 110 are overlapped. For example, the four individual display devices 110 can have different driving orders based on how they are stacked on each other and overlapped.

Referring to FIGS. 7 to 10, a large-area display device 100 according to embodiments of the present disclosure can include a two-overlapping area in which two individual display devices 110 overlap and a four-overlapping area in which four individual display devices 110 are overlapped. Each individual display device 110 is formed to be thin, so that it is assumed that the step difference in the two-overlapping areas and the four-overlapping areas can be considered to be negligible.

In these two-overlapping areas and four-overlapping areas, the pixel P of the individual display device 110 positioned below does not display an image.

Figure 7:
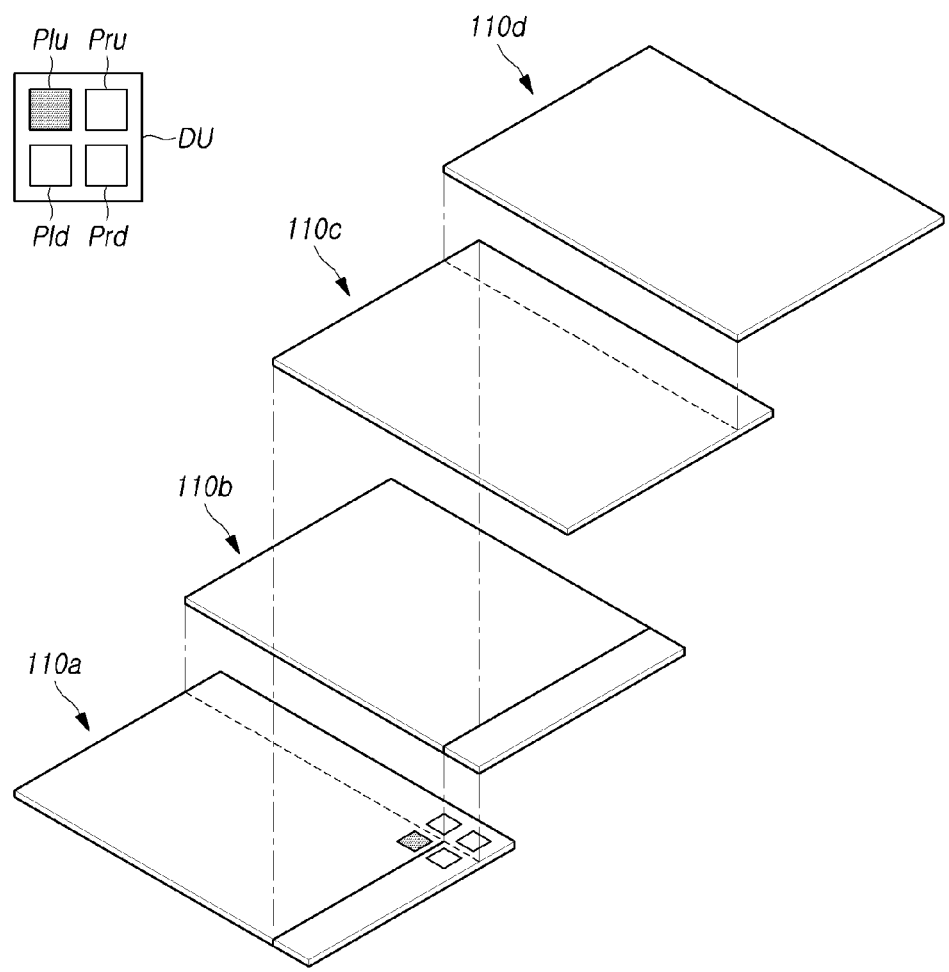
FIGS. 7 to 10 illustrate configurations in which pixels emitting light in a driving unit are driven differently according to the order in which four individual display devices are overlapped according to embodiments of the present disclosure.

Referring to FIG. 7, the upper left individual display device 110a is positioned at the bottom, and the individual display devices 110 positioned in the same row as the upper left individual display device 110a are sequentially stacked.

After the individual display devices 110 positioned in the same row as the upper left individual display device 110a are all stacked, the individual display devices 110 positioned in the row immediately following the upper left individual display device 110a are sequentially stacked.

Referring to FIG. 7, the upper left individual display device 110a is positioned at the bottom, and the upper right individual display device 110b positioned in the same row as the upper left individual display device 110a is stacked. On the upper right individual display device 110b, the lower left individual display device 110c and the lower right individual display device 110d are sequentially stacked.

In the above-described stacked structure, the upper left pixel Plu among the plurality of pixels P included in the driving unit DU is the one that emits light, while the other overlapped pixels P are controlled to remain off. In one driving unit DU shown in the upper left individual display device 110a, the remaining three pixels Pru, Pld, and Prd except for the upper left pixel Plu can overlap other individual display devices 110b, 110c, 110d.

In the large-area display device 100 according to the embodiments of the present disclosure, as shown in FIG. 7, individual display devices 110 are stacked, and only the upper left pixel Plu is driven in one driving unit DU, thereby extending the lifespan of the large-area display device 100 and solving the image discontinuity at a seam region. For example, if four overlapping pixels P all emit light, then this can generate unwanted heat that can decrease the lifespan of the large-area display device 100, which can also potentially degrade image quality in the seam areas (e.g., making the seam areas appear too bright relative to other portions of the display area of the large-area display device 100).

Figure 8:
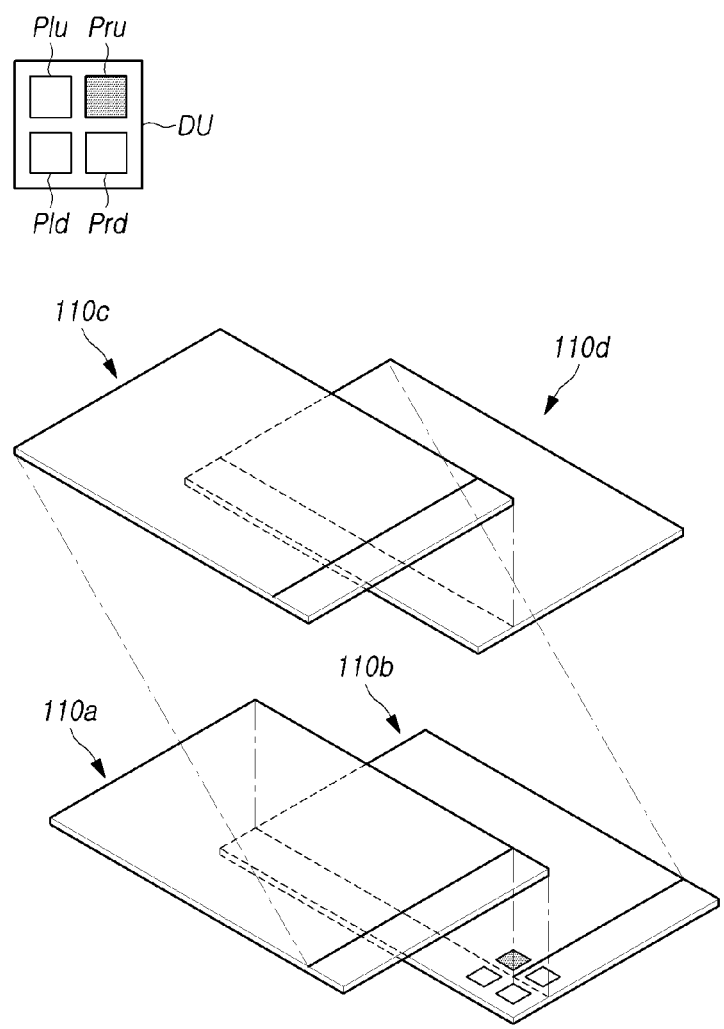

Referring to FIG. 8, the upper right individual display device 110b is positioned at the bottom, and the individual display devices 110 positioned in the same row as the upper right individual display device 110b are sequentially stacked.

After the individual display devices 110 positioned in the same row as the upper right individual display device 110b are all stacked, the individual display devices 110 positioned in the row immediately following the upper right individual display device 110b are sequentially stacked.

Referring to FIG. 8, the upper right individual display device 110b is positioned at the bottom, and the upper left individual display device 110a positioned in the same row as the upper right individual display device 110b is stacked. On the upper left individual display device 110a, a lower right individual display device 110d and a lower left individual display device 110c are sequentially stacked.

In the above-described stacked structure, the upper right pixel Pru among the plurality of pixels P included in the driving unit DU is the one that emits light, while the other overlapped pixels P are controlled to remain off. In one driving unit DU shown in the upper right individual display device 110b, the remaining three pixels Plu, Pld, and Prd except for the upper right pixel Pru can be overlapped with other individual display devices 110a, 110c, 110d.

In the large-area display device 100 according to the embodiments of the present disclosure, as shown in FIG. 8, individual display devices 110 are stacked and only the upper right pixel Pru is driven in one driving unit DU, thereby extending the lifespan of the large-area display device and solving any image discontinuity issues at a seam region.

Figure 9:
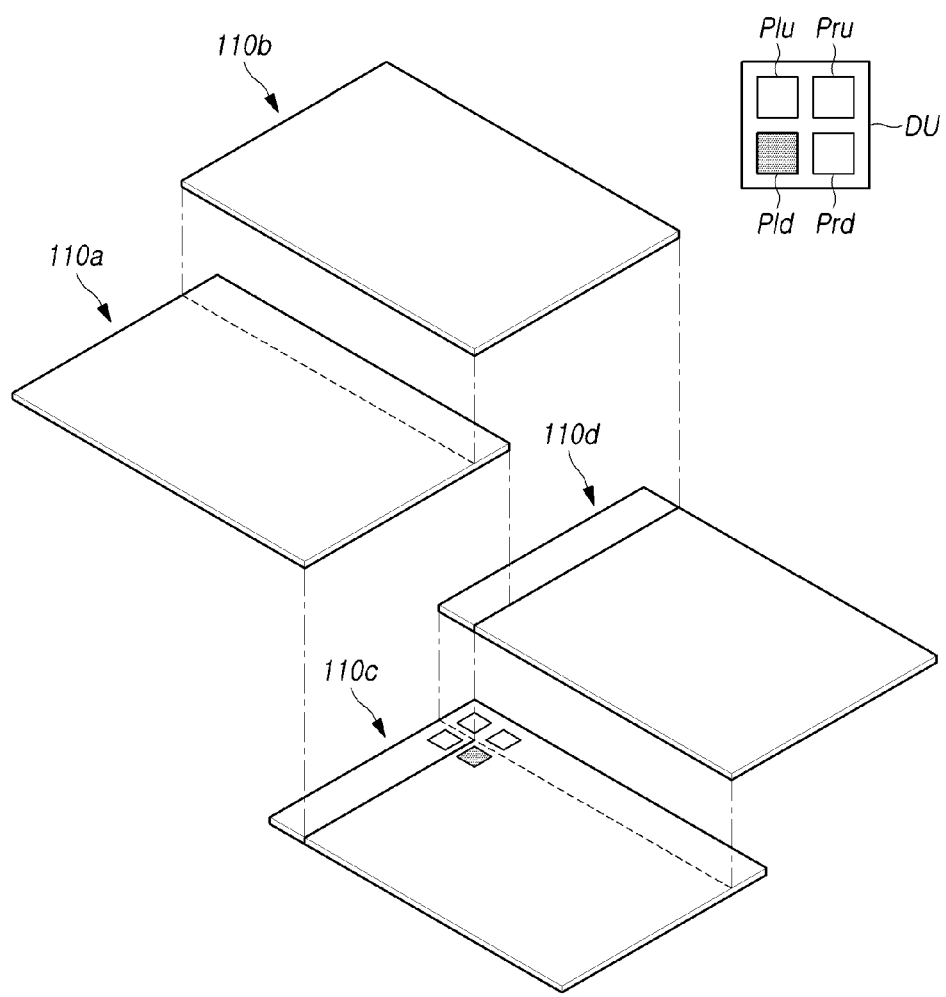

Referring to FIG. 9, the lower left individual display device 110c is positioned at the bottom, and the individual display devices 110 positioned in the same row as the lower left individual display device 110c are sequentially stacked.

After the individual display devices 110 positioned in the same row as the lower left individual display device 110c are all stacked, the individual display devices 110 positioned in the row immediately preceding the lower left individual display device 110c are sequentially stacked.

Referring to FIG. 9, the lower left individual display device 110c is positioned at the bottom, and the lower right individual display device 110d positioned in the same row is sequentially stacked. On the lower right individual display device 110d, the upper left individual display device 110a and the upper right individual display device 110b are sequentially stacked.

In the above-described stacked structure, the lower left pixel Pld among the plurality of pixels P included in the driving unit DU is the one that emits light. In one driving unit DU shown in the lower left individual display device 110c, the remaining three pixels Plu, Pru, and Prd except for the lower left pixel Pld can be overlapped with other individual display devices 110a, 110b, 110d and be controlled to remain off, since they are positioned underneath a portion of another individual display device 110.

In the large-area display device 100 according to the embodiments of the present disclosure, as shown in FIG. 9, individual display devices 110 are stacked and only the lower left pixel Pld is driven in one driving unit DU, thereby extending the lifespan of the large-area display device and solving any image discontinuity issues at a seam region.

Figure 10:
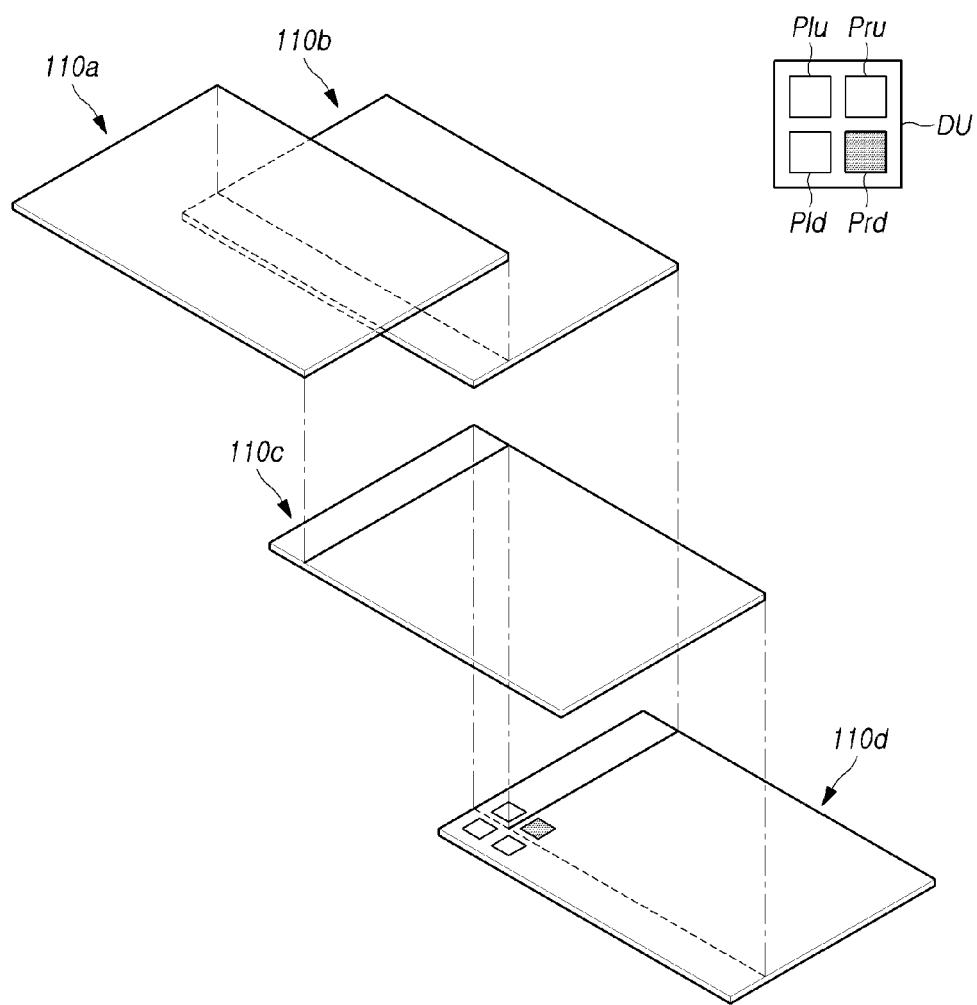

Referring to FIG. 10, the lower right individual display device 110d is positioned at the bottom, and the individual display devices 110 positioned in the same row as the lower right individual display device 110d are sequentially stacked. In other words, the four individual display devices 110 can be positioned like slightly overlapping petals of a flower (e.g., similar one rectangular or square sheet made up of four rectangles or squares).

After the individual display devices 110 positioned in the same row as the lower right individual display device 110d are all stacked, the individual display devices 110 positioned in the row immediately preceding the lower right individual display device 110d are sequentially stacked.

Referring to FIG. 10, the lower right individual display device 110d is positioned at the bottom, and the lower left individual display device 110c positioned in the same row as the lower right individual display device 110d is sequentially stacked. On the lower left individual display device 110c, the upper right individual display device 110b and the upper left individual display device 110a are sequentially stacked.

In the above-described stacked structure, the lower right pixel Prd among the plurality of pixels P included in the driving unit DU is the one that emits light. In one driving unit DU shown in the lower right individual display device 110d, the remaining three pixels Plu, Pru, and Pld except for the lower right pixel Prd can be overlapped with other individual display devices 110a, 110b, 110c and these three overlapped pixels P can be controlled to remain off.

In the large-area display device 100 according to the embodiments of the present disclosure, as shown in FIG. 10, individual display devices 110 are stacked and only the lower right pixel Prd is driven in one driving unit DU, thereby extending the lifespan of the large-area display device 100 and solving the image discontinuity at a seam region.

Figure 11:
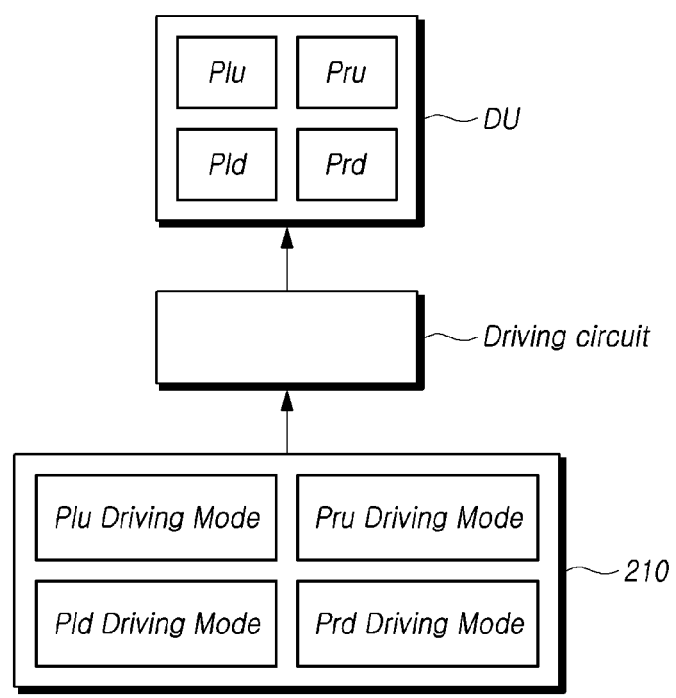
FIG. 11 schematically illustrates that emitting pixels in a driving unit vary according to the control of the integrated controller according to an embodiment of the present disclosure.

FIG. 11 schematically illustrates that emitting pixels P in a driving unit DU vary according to the control of the integrated controller 210.

Referring to FIG. 11, the integrated controller 210 can receive information on a driving mode for driving the large-area display device 100. The integrated controller 210 can transmit information on which pixel P among the driving units DU is to be driven to a driving circuit of each of the individual display devices 110 based on the input information.

For example, the integrated controller 210 can receive information on the driving mode to drive the large-area display device 100 among an upper left pixel Plu driving mode, an upper right pixel Pru driving mode, a lower left pixel Pld driving mode, and a lower right pixel Prd driving mode.

A driving circuit of the individual display devices 110 can display an image by driving any one of the pixels P included in the driving unit DU based on information received from the integrated controller 210.

Accordingly, the individual display devices 110 included in the large-area display device 100 can display an image by driving only the selected pixel.

Figure 12:
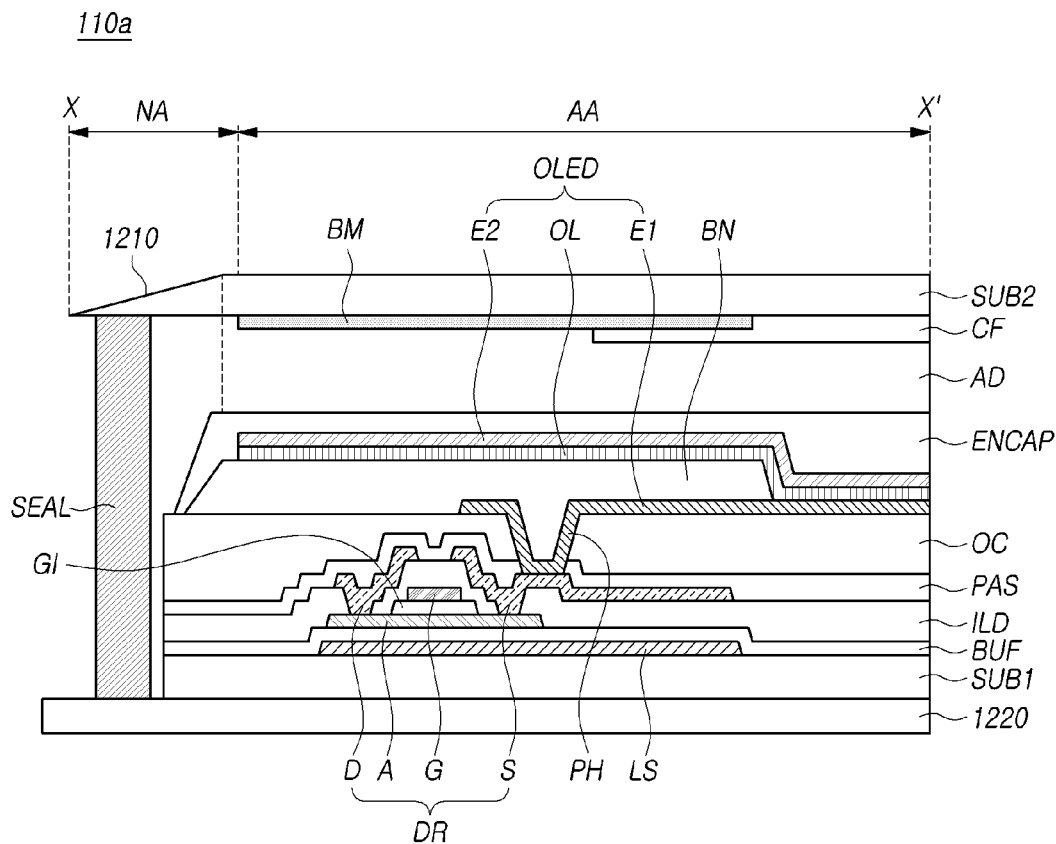
FIG. 12 is a cross-sectional view taken along line X-X' of the individual display device of FIG. 4 according to an embodiment of the present disclosure.

FIG. 12 is a cross-sectional view taken along line X-X' of the individual display device 110 of FIG. 4.

Although the upper left individual display device 110a is illustrated in FIG. 12 as an example, the structure shown in FIG. 12 can be commonly applied to the individual display device 110 according to embodiments of the present disclosure.

Referring to FIG. 12, the upper left individual display device 110a according to embodiments of the present disclosure can include a first substrate SUB1, a second substrate SUB2, and an encapsulation layer ENCAP.

A plurality of pixels P are defined on the first substrate SUB1, and each of the plurality of pixels P can include an organic light emitting diode OLED and a driving transistor DR for driving the organic light emitting diode OLED Referring to FIG. 12, the light blocking layer LS can be positioned on the first substrate SUB1. The light blocking layer LS can be configured to block external light from being incident and thereby prevent photocurrent from being generated in the transistor.

A buffer layer BUF can be positioned on the light blocking layer LS. The buffer layer BUF serves to protect the thin film transistor formed in a subsequent process from impurities, such as alkali ions leaking or other types of outgassing from the light blocking layer LS. The buffer layer BUF can be a silicon oxide (SiOx), a silicon nitride (SiNx), or a multilayer thereof.

A semiconductor layer A of the driving transistor DR can be positioned on the buffer layer BUF. The semiconductor layer A can be made of a silicon semiconductor or an oxide semiconductor. The silicon semiconductor can include amorphous silicon or crystallized polycrystalline silicon. The semiconductor layer A can include a drain region and a source region containing p-type or n-type impurities, and include a channel therebetween.

A gate insulating layer GI can be positioned on the semiconductor layer A. The gate insulating layer GI can be formed of silicon oxide (SiOx), silicon nitride (SiNx), or a multilayer thereof. A gate electrode G can be positioned on the gate insulating layer GI in a predetermined region of the semiconductor layer A, that is, at a position corresponding to the channel when the impurity is implanted. The gate electrode G can be formed of any one selected from the group consisting of molybdenum (Mo), aluminum (Al), chromium (Cr), gold (Au), titanium (Ti), nickel (Ni), neodymium (Nd), and copper (Cu), or an alloy thereof. In addition, the gate electrode G can be a multi-layer made of any one selected from the group consisting of molybdenum (Mo), aluminum (Al), chromium (Cr), gold (Au), titanium (Ti), nickel (Ni), neodymium (Nd), and copper (Cu), or an alloy thereof. For example, the gate electrode G can be a double layer of molybdenum/aluminum-neodymium or molybdenum/aluminum.

An interlayer insulating layer ILD that insulates the gate electrode G can be positioned on the gate electrode G. The interlayer insulating layer ILD can be a silicon oxide layer (SiOx), a silicon nitride layer (SiNx), or a multilayer thereof. A source electrode S and a drain electrode D are positioned on the interlayer insulating layer ILD. The source electrode S and the drain electrode D are connected to the semiconductor layer A through a contact hole exposing the source region of the semiconductor layer A. The source electrode S and the drain electrode D can be formed of a single layer or multiple layers, and if the source electrode S and the drain electrode D are a single layer, it can be formed of any one selected from the group consisting of molybdenum (Mo), aluminum (Al), chromium (Cr), gold (Au), titanium (Ti), nickel (Ni), neodymium (Nd), and copper (Cu) or an alloy thereof. In addition, if the source electrode S and the drain electrode D are multi-layered, it can be formed by a double layer of molybdenum/aluminum-neodymium, a triple layer of titanium/aluminum/titanium, molybdenum/aluminum/molybdenum or molybdenum/aluminum-neodymium/molybdenum. Accordingly, the driving transistor DR can be configured to include the semiconductor layer A, the gate electrode G, the source electrode S, and the drain electrode D.

A passivation layer PAS is positioned on the first substrate SUB1 including the driving transistor DR. The passivation layer PAS is an insulating layer that protects an underlying device, and can be a silicon oxide layer (SiOx), a silicon nitride layer (SiNx), or a multilayer thereof.

An overcoat layer OC is positioned on the passivation layer PAS. The overcoat layer OC can be a planarization layer for reducing a step difference in a lower structure, and can be made of an organic material such as polyimide, benzocyclobutene series resin, or acrylate. A pixel contact hole PH for exposing the source electrode S by exposing the passivation layer PAS can be positioned in a portion of the overcoat layer OC.

The organic light emitting diode OLED can include a first electrode E1, an organic light emitting layer OL, and a second electrode E2 that face each other.

The first electrode E1 can be an anode. The first electrode E1 can be connected to the source electrode S of the driving transistor DR through the pixel contact hole PH passing through the overcoat layer OC and the passivation layer PAS. The first electrode E1 can be made of a transparent conductive material, such as ITO (Indium Tin Oxide), IZO (Indium Zinc Oxide), or ZnO (Zinc Oxide), depending on the light emitting method adopted, and can function as a transmissive electrode, or can function as a reflective electrode by including a reflective layer. The reflective layer can be made of aluminum (Al), copper (Cu), silver (Ag), nickel (Ni), or an alloy thereof, can be preferably made of APC (silver/palladium/copper alloy).

A bank layer BN can be disposed on the first substrate SUB1 on which the first electrode E1 is formed. The bank layer BN can be formed of an organic material, such as polyimide, benzocyclobutene series resin, or acrylate. The bank layer BN can include an opening exposing most of the first electrode E1. The bank layer BN can be disposed to expose a central portion of the first electrode E1 but to cover a side end of the first electrode E1.

An organic light emitting layer OL can be disposed on the first substrate SUB1 on which the bank layer BN is formed. The organic light emitting layer OL is a layer which emits light by combining electrons and holes, and can further include any one or more of an emission layer (EML), a hole injection layer (HIL), a hole transport layer (HTL), and electron transport layer (ETL) and an electron injection layer (EIL).

The second electrode E2 can be disposed on the organic light emitting layer OL. The second electrode E2 can be widely formed on the entire surface of the first substrate SUB1. The second electrode E2 can function as a transmissive electrode or a reflective electrode corresponding to the adopted light emitting method. If the second electrode E2 is a transmissive electrode, the second electrode E2 can be formed of a transparent conductive material, such as Indium Tin Oxide (ITO), Indium Zinc Oxide (IZO), or can be made of magnesium (Mg), calcium (Ca), aluminum (Al), silver (Ag), or an alloy thereof having a thin thickness enough to transmit light.

An encapsulation layer ENCAP can be positioned on the organic light emitting diode OLED The encapsulation layer ENCAP can block the penetration of external moisture or oxygen into the organic light emitting diode OLED, which is vulnerable to external moisture or oxygen.

The encapsulation layer ENCAP can be disposed as one layer, but can also be disposed as a plurality of layers. For example, if the encapsulation layer ENCAP includes a plurality of layers, the encapsulation layer ENCAP can include one or more inorganic encapsulation layers and one or more organic encapsulation layers. As a specific example, the encapsulation layer can be disposed in a structure in which a first inorganic encapsulation layer, the organic encapsulation layer and a second inorganic encapsulation layer are sequentially stacked.

The first inorganic encapsulation layer can be formed to be closest to the organic light emitting diode OLED on the substrate SUB on which the second electrode E2 corresponding to the cathode is formed. The first inorganic encapsulation layer is formed of, for example, an inorganic insulating material capable of low-temperature deposition, such as silicon nitride (SiNx), silicon oxide (SiOx), silicon oxynitride (SiON), or aluminum oxide ($Al_2O_3$). Since the first inorganic encapsulation layer is deposited at a low temperature, the first inorganic encapsulation layer can prevent the organic light emitting layer OL including an organic material vulnerable to high temperature from being damaged during the deposition process.

The organic encapsulation layer can have a smaller area than the first inorganic encapsulation layer. The organic encapsulation layer can serve as a buffer for relieving stress between layers due to bending of the individual display device 110, and can serve to enhance planarization performance. The organic encapsulation layer can be formed of, for example, an organic insulating material such as acrylic resin, epoxy resin, polyimide, polyethylene, or silicon oxycarbon (SiOC).

An adhesive member AD for bonding the first substrate SUB1 and the second substrate SUB2 can be disposed on the encapsulation layer ENCAP. The adhesive member AD is also referred to as a filler. The adhesive member AD can fill a gap between the first substrate SUB1 and the second substrate SUB2, and the first substrate SUB1 and the second substrate SUB2 can be bonded to each other by the adhesive member AD.

A sealing member SEAL can be located on the outer side of the adhesive member AD. In this situation, the individual display device 110 according to embodiments of the present disclosure can be a panel sealed by a sealing method referred to as a Dam&Fill method.

The adhesive member AD can serve as a filler for filling the space existing between the first substrate SUB1 and the second substrate SUB2, and the sealing member SEAL can seal the outside of the adhesive member AD while bonding the first substrate SUB1 and the second substrate SUB2 to prevent the adhesive member AD from flowing out of the panel.

A black matrix BM can be positioned on the adhesive member AD. The black matrix BM can be configured to separate the sub-pixels SP and prevent light from being mixed between the sub-pixels SP.

In some situations, the second substrate SUB2 can be a color filter substrate. If the second substrate SUB2 is a color filter substrate, the second substrate SUB2 can include a color filter CF positioned on a light emitting region where the organic light emitting diode OLED emits light. The color filter CF can include a material having a predetermined absorption rate for light in a specific wavelength band.

The second substrate SUB2 can include at least one inclined surface 1210 (e.g., such as a tapered edge or beveled edge). The inclined surface 1210 is configured to secure a sufficient viewing angle even when the individual display devices 110 are overlapped.

One end of the inclined surface 1210 can be located outside the sealing member SEAL. Accordingly, the light emitted from the individual display devices 110 located below the overlapping individual display devices 110 can be emitted at a wide angle.

The other end of the inclined surface 1210 can be located outside the display area AA. Accordingly, the propagation direction of the light emitted from the individual display devices 110 positioned above the overlapping individual display devices 110 may not be distorted.

The inclined surface 1210 can be positioned on all four sides (e.g., upper, lower, left and right) of the individual display device 110 to have the same width. Alternatively, the inclined surface 1210 can be positioned with a wider width on two side surfaces (e.g., left and right) of the individual display device 110, and can be positioned with a narrower width on the other two sides (e.g., upper and lower) of the individual display device 110.

A back cover 1220 can be further positioned on the rear side of the first substrate SUB1. If the back cover 1220 is positioned on the rear surface of the first substrate SUB1, the above-described sealing member SEAL can be used for bonding the second substrate SUB2 and the back cover 1220.

Figure 13:
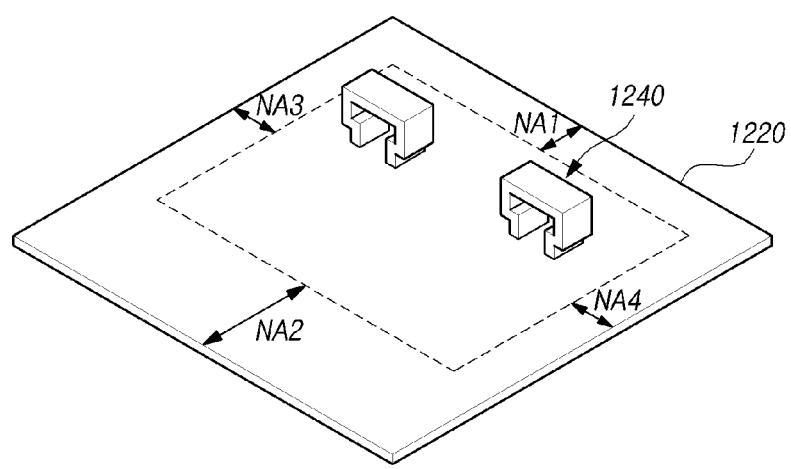
FIG. 13 illustrates a state in which a guide rail is attached to an individual display device according to embodiments of the present disclosure.

FIG. 13 illustrates a state in which a guide rail 1240 is attached to an individual display device 110 according to embodiments of the present disclosure.

Referring to FIG. 13, a guide rail 1240 can be attached to the individual display device 110 according to embodiments of the present disclosure.

The guide rail 1240 can be used to fix the individual display devices 110 together at an appropriate position after changing the overlapping structure of the individual display devices 110.

Specifically, the large-area display device 100 according to embodiments of the present disclosure can include detachable individual display devices 110. The individual display devices 110 can be fixed at appropriate positions after the overlapping structure is changed, and a guide rail 1240 can be used to fix the individual display devices 110. For example, the individual display devices 110 can be overlapped and buttoned together at various positions and unbuttoned, in order to provide a large-area display device 100 having different sizes and different shapes, which is readjustable and reconfigurable.

Referring to FIG. 13, the guide rail 1240 can be attached to the rear surface of the back cover 1220 of the individual display device 110.

The guide rail 1240 can be attached to move the individual display device 110 in the vertical direction.

Figure 14:
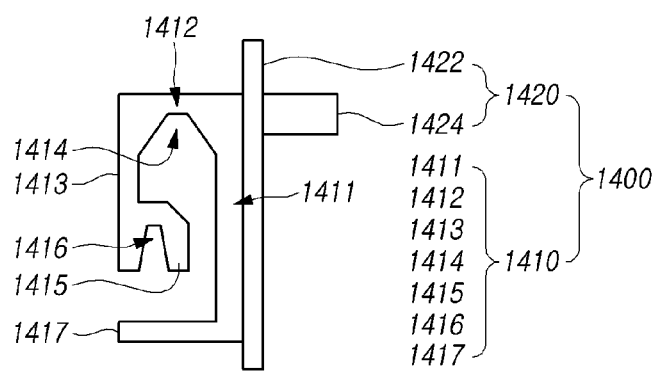
FIG. 14 is a diagram for explaining an individual display device position adjusting member according to embodiments of the present disclosure.

FIG. 14 is a diagram for explaining an individual display device position adjusting member 1400 according to embodiments of the present disclosure.

Referring to FIG. 14, the individual display device position adjusting member 1400 can include a horizontal axis position adjusting member 1410 and a vertical axis position adjusting member 1420.

The individual display device position adjusting member 1400 can be coupled to the guide rail 1240 described above. The position of each of the individual display devices 110 in the large-area display device 100 can be finely adjusted by the individual display device position adjusting member 1400.

The horizontal axis position adjusting member 1410 can be fixed to a support plate 1422 of the vertical axis position adjusting member 1420. For example, the horizontal axis position adjusting member 1410 and the support plate 1422 can be integrally formed.

The horizontal axis position adjusting member 1410 can include a wall fixing portion 1411, a rear projection 1412, a first groove forming portion 1413, a first groove 1414, a second groove forming portion 1415, and a second groove 1416.

The wall fixing portion 1411 can contact the support plate 1422 to connect the horizontal axis position adjusting member 1410 and the vertical axis position adjusting member 1420. The wall fixing portion 1411 can be fixed to the support plate 1422 using, for example, a coupling member (e.g., a screw or a fastener).

The rear projection 1412 can be formed to extend from the wall fixing portion 1411. The direction of the extension of the rear projection 1412 can be perpendicular to the support plate 1422, but the rear projection 1412 can also extend from the wall fixing portion 1411 at an acute angle or an obtuse angle from the support plate 1422.

The first groove forming portion 1413 can be formed to extend from the rear projection 1412. The first groove 1414 is formed by the first groove forming portion 1413, the rear projection 1412 and the wall fixing portion 1411. The first groove 1414 is configured to receive a horizontal frame 1730 for fixing an individual display device 110.

The first groove 1414 can have an angled shape as shown in FIG. 14, but can also be formed as a curved surface without corners.

The second groove forming portion 1415 can extend from the first groove forming portion 1413 to form a second groove 1416 as shown in FIG. 14. Alternatively, the second groove forming portion 1415 can protrude from the wall fixing portion 1411 to form the second groove 1416.

The second groove 1416 is configured to receive a horizontal frame for fixing an individual display device 110.

The first groove 1414 can be used for mounting the individual display device 110 to display an image. The second groove 1416 can be used for temporarily mounting the individual display device 110.

The second groove 1416 is located below the first groove 1414. When the individual display devices are temporarily mounted on the horizontal frame to change the stack structure of the individual display devices 110, the horizontal frame 1730 can be accommodated in the second groove 1416.

If necessary, the horizontal axis position adjusting member 1410 can further include a flat bottom surface 1417 positioned below the second groove 1416.

The vertical axis position adjusting member 1420 can include a support plate 1422 and a vertical axis fine-adjusting member 1424.

One side of the vertical axis fine-adjusting member 1424 can be fixed to the support plate 1422. The other side of the vertical axis fine-adjusting member 1424 can be connected to the guide rail 1240. Also, the vertical axis fine-adjusting member 1424 can further include a brake or a stopper for accurately fixing the vertical axis position of the individual display device 110.

Figure 15:
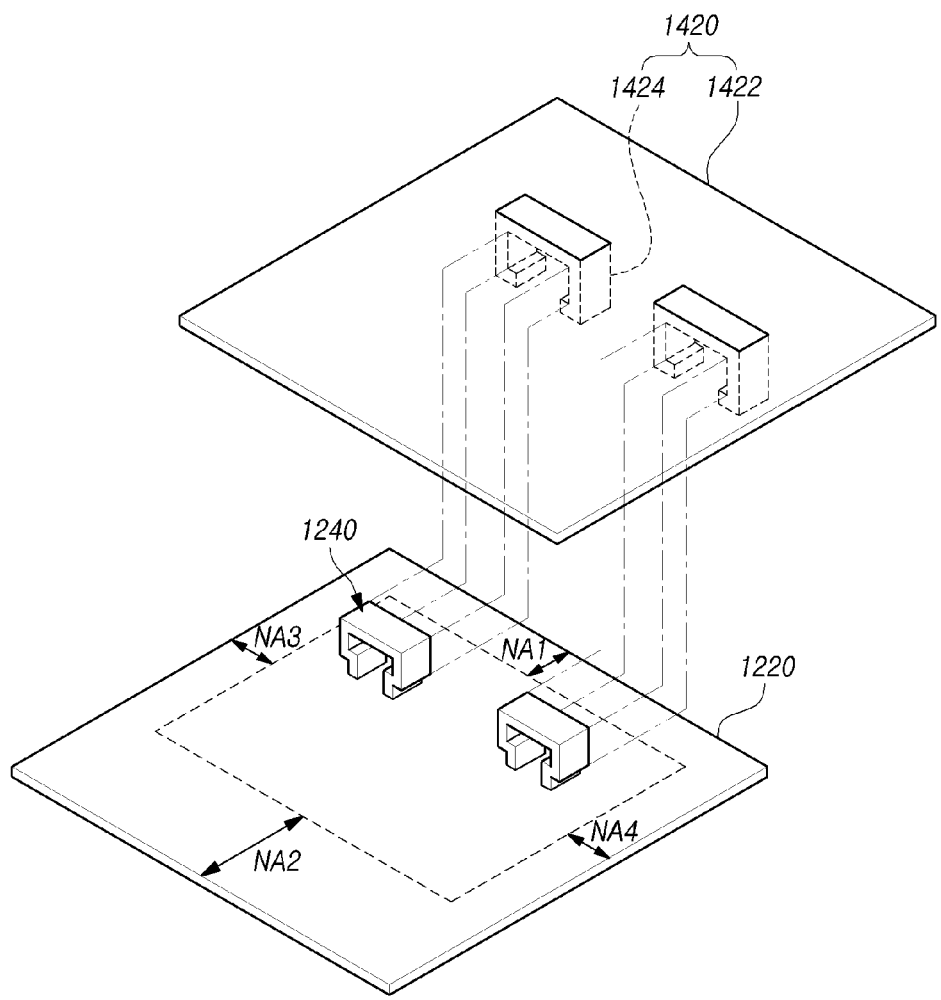
FIG. 15 illustrates a state in which a guide rail and a vertical axis position adjusting member are coupled according to an embodiment of the present disclosure.

FIG. 15 illustrates a state in which a guide rail 1240 and a vertical axis position adjusting member 1420 are coupled.

Referring to FIG. 15, the guide rail 1240 is disposed on the rear surface of the back cover 1220, and the vertical axis fine-adjusting member 1424 is fastened to the guide rail 1240.

Referring to FIG. 15, the vertical axis position adjusting member 1420 can be coupled to the guide rail 1240 by moving from the upper side to the lower side of the individual display device 110. Alternatively, the vertical axis position adjusting member 1420 can be coupled to the guide rail 1240 by moving from the lower side to the upper side of the individual display device 110.

For example, if the bezel of the first width NA1 is positioned above the individual display device 110 and the bezel of the second width NA2 is positioned below the individual display device 110, when the vertical axis fine-adjusting member 1424 is fastened to the guide rail 1240, the individual display device position adjusting member 1400 can move from the upper side to the lower side of the individual display device 110, and can be fastened to the guide rail 1240.

Figure 16:
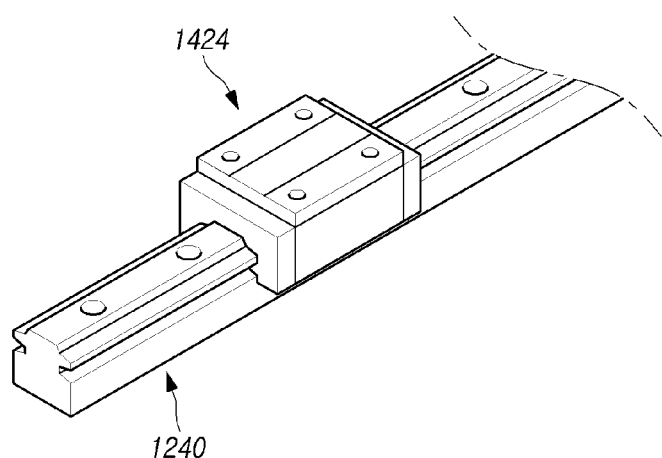
FIG. 16 is a diagram illustrating an embodiment in which the guide rail and the vertical axis fine-adjusting member are implemented as a sliding rail.

FIG. 16 is a diagram illustrating an embodiment in which the guide rail 1240 and the vertical axis fine-adjusting member 1424 are implemented as a sliding rail.

Referring to FIG. 16, the guide rail 1240 and the vertical axis fine-adjusting member 1424 according to embodiments of the present disclosure can be configured as a general sliding rail.

Referring to FIG. 16, the vertical axis fine-adjusting member 1424 can move along a groove provided in the guide rail 1240.

The guide rail 1240 can be attached to the rear side of the individual display device 110, so that the position of the vertical axis of the individual display device 110 can be adjusted.

The vertical axis fine-adjusting member 1424 or the guide rail 1240 can further include a brake or limit stoppers for fixing the individual display device 110 to an accurate position.

Figure 17:
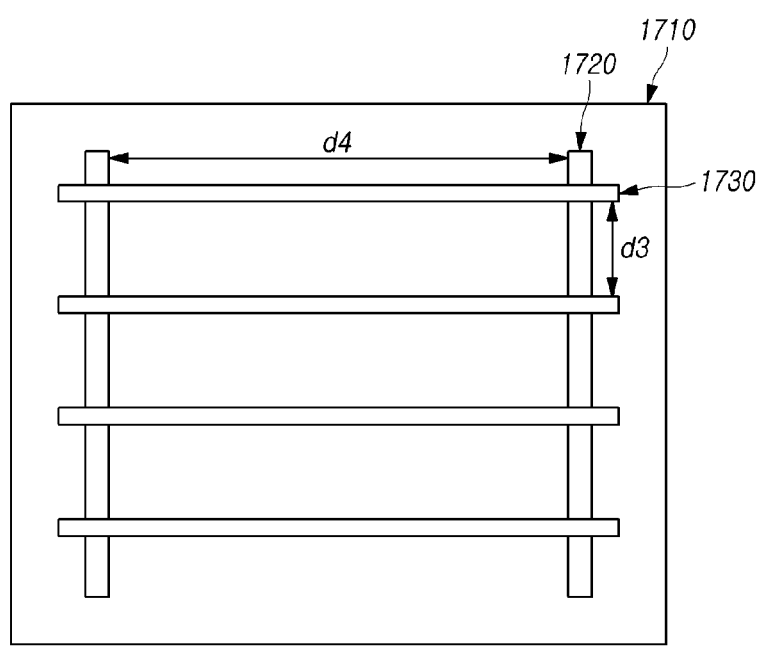
FIG. 17 is a diagram for explaining a horizontal frame configured to mount individual display devices according to an embodiment of the present disclosure.

FIG. 17 is a diagram for explaining a horizontal frame 1730 configured to mount individual display devices.

Referring to FIG. 17, the large-area display device 100 according to embodiments of the present disclosure can be implemented by mounting a plurality of individual display devices 110 on the horizontal frame 1730.

Referring to FIG. 17, one or more horizontal frames 1730 can be disposed.

The horizontal frame 1730 can be fixed to a wall 1710. There can be further disposed a support member configured to fix the horizontal frame 1730 to the wall 1710 between the wall 1710 and the horizontal frame 1730.

Referring to FIG. 17, the support member can be a support frame 1720. To more securely fix the horizontal frame 1730 to the wall 1710, one horizontal frame 1730 can be supported by two or more support frames 1720.

The support frame 1720 and the horizontal frame 1730 can be joined through, for example, welding or the like. Alternatively, the support frame 1720 and the horizontal frame 1730 can be connected through a separate fastening member or the like to be coupled in an easily separable manner.

Referring to FIG. 17, the support frame 1720 can support two or more horizontal frames 1730. If three or more horizontal frames 1730 are disposed, the distance d3 between the horizontal frames 1730 can be the same.

The distance d3 between the horizontal frames 1730 can be designed in consideration of the spacing between the overlapping regions of the individual display devices 110 disposed in adjacent rows. The individual display devices 110 positioned in adjacent rows can be attached to the individual display device position adjusting member 1400 and mounted on a horizontal frame 1730 corresponding to each individual display device 110. By adjusting the position of the above-described vertical axis position adjusting member 1420 on the guide rail 1240, there can be finely adjusted an area in which the individual display devices 110 vertically overlap.

If one horizontal frame 1730 is supported by two or more support frames 1720, two or more support frames 1720 can be disposed to be spaced apart from each other by a predetermined distance d4.

The distance d4 at which the support frames 1720 are spaced apart from each other can be set in consideration of the rigidity of the horizontal frame 1730, the weight of the individual display devices 110 mounted on the horizontal frame 1730, and an area in which the individual display devices 110 are mounted in the large-area display device 100. In FIG. 17, it is illustrated an embodiment in which one horizontal frame 1730 is supported by two support frames 1720, but the present invention is not limited thereto.

The individual display devices 110 can be attached to the individual display device position adjusting member 1400 and mounted on the horizontal frame 1730. By adjusting the position of the individual display device position adjusting member 1400, it is possible to finely adjust the amount of overlapping area between the left and right adjacent individual display devices 110 in the same row.

Figure 18:
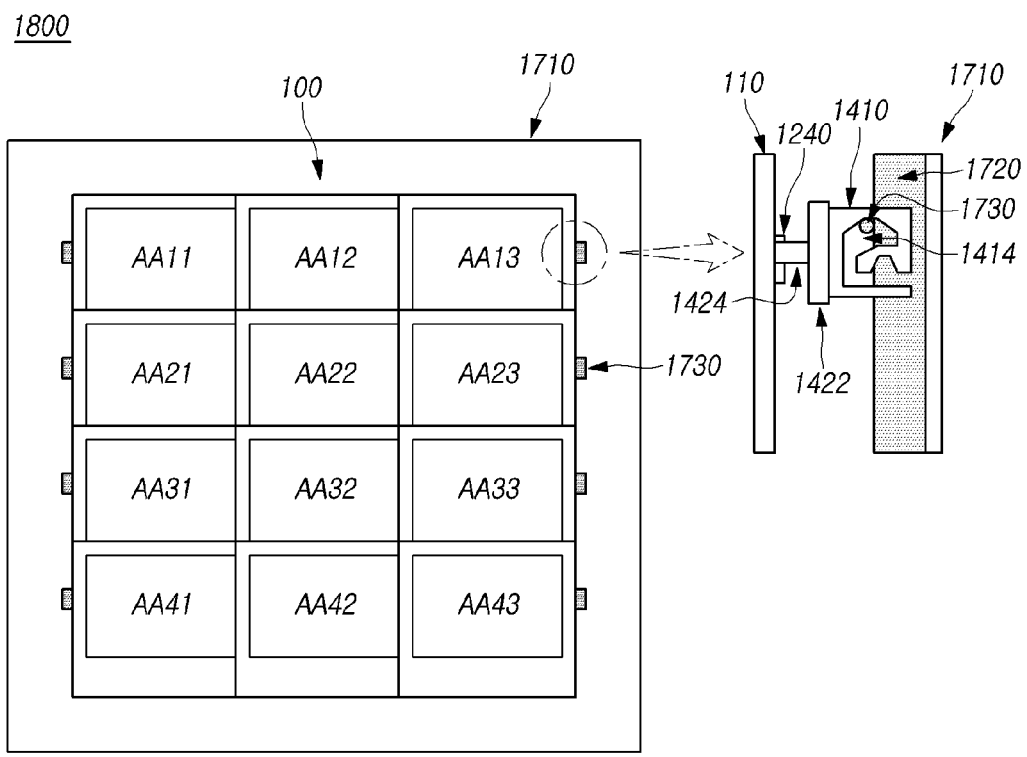
FIG. 18 is a diagram illustrating an example of a large-area display device driving system according to embodiments of the present disclosure.

FIG. 18 is a diagram illustrating an example of a large-area display device driving system 1800 according to embodiments of the present disclosure.

Referring to FIG. 18, the large-area display device driving system 1800 according to embodiments of the present disclosure can be constructed in such a way that a plurality of individual display devices 110 constituting the large-area display device 100 are arranged in a horizontal frame 1730.

Each of the plurality of individual display devices 110 overlaps the other individual display devices 110 in at least one of the upper and lower directions while being mounted on the horizontal frame 1730. Each of the plurality of individual display devices 110 overlaps the other individual display devices 110 in at least one of the left and right directions while being mounted on the horizontal frame 1730.

With respect to the area where the two individual display devices 110 overlap each other, the non-display area NA of the individual display device 110 positioned on the upper side can be positioned on the display area AA of the individual display device 110 positioned on the lower side.

In the display area AA of the individual display device 110 overlapping the non-display area NA and positioned on the lower side, there are disposed only pixels P which do not emit light in the driving unit DU (e.g., pixels P that are covered upon in the seam areas of overlapping individual display devices 110 can be controlled to remain off). Accordingly, even if the plurality of individual display devices 110 are disposed to overlap each other, image discontinuity due to the seam area can be not recognized.

In the large-area display device 100, a plurality of individual display devices 110 can be separated, and the plurality of individual display devices 110 can be stacked in a predetermined order. A pixel P displaying an image in one driving unit DU can be set differently according to the order in which the individual display devices 110 are stacked.

In order to finely adjust the upper, lower, left and right positions of the plurality of individual display devices 110 in the large-area display device 100, each of the plurality of individual display devices 110 can be coupled to the individual display device position adjusting member 1400 through the guide rail 1240. The horizontal and vertical positions of the individual display devices 110 can be adjusted through the individual display device position adjusting member 1400.

In the large-area display device driving system 1800 according to embodiments of the present disclosure, each of the individual display devices 110 can have a different area of the display area AA viewed from the outside.

Referring to FIG. 18, with respect to two individual display devices 110 overlapping each other, the individual display device on the right side is located on the upper side of the individual display device on the left side, and the individual display device on the lower side is located on the upper side of the individual display device on the upper side.

Accordingly, in FIG. 18, the area AA11 of the display area viewed by the upper left individual display device is smaller than the area AA13 of the display area viewed by the upper right individual display device. (e.g., AA11<AA13). In addition, the area AA13 of the display area viewed by the upper right individual display device is smaller than the area AA43 of the display area visually viewed by the lower right individual display device (e.g., AA13<AA43). For example, the individual display devices 110 can be arranged similar to the overlapping scales of a fish, in order to provide a large uniform display area for the large-area display device 100.

Referring to FIG. 18, the large-area display device driving system 1800 according to embodiments of the present disclosure can display an image in a state in which the horizontal frame 1730 is all accommodated in the first groove 1414.

Referring to FIG. 18, the shape of the horizontal frame 1730 can be substantially the same as the shape of the first groove 1414, but can be different from the shape of the first groove 1414. If the shape of the horizontal frame 1730 and the shape of the first groove 1414 are substantially the same, the individual display devices 110 can be fixed at a specific angle.

It will be provided a brief description of the embodiments of the present disclosure as follows.

Embodiments of the present disclosure can provide a large-area display device 100 including a first individual display device (e.g., 110a) including a plurality of pixels P, and a second individual display device (e.g., 110c) including a plurality of pixels P and overlapping the first individual display device 110a in an overlapping area, in which the first individual display device 110a is driven so that pixels P located in the overlapping area among the plurality of pixels P do not display an image, in which the second individual display device 110c drives pixels P located in the overlapping area among the plurality of pixels P to display an image.

In embodiments of the present disclosure, the first individual display device 110a and the second individual display device 110c can display an image by driving one pixel (e.g., Plu) in a driving unit DU including two or more pixels P, and, in one driving unit DU, while any one (e.g., Plu) of the two or more pixels P emits light, the remaining pixels (e.g., Pru, Pld, Prd) except for the one Plu of the two or more pixels P are controlled to not emit light.

In embodiments of the present disclosure, the second individual display device 110c can include a narrow bezel of a first width (e.g., NA1), at least a portion of which overlaps with the first individual display device 110a, and a distance (e.g., d1) between two pixels P displaying an image in adjacent driving units DU can be greater than or equal to the first width NA1.

In embodiments of the present disclosure, the narrow bezel can be positioned to overlap a pixel (e.g., Pld, Prd) which does not display an image in a driving unit DU.

In embodiments of the present disclosure, the large-area display device 100 can include a plurality of individual display devices 110 including the first individual display device 110a and the second individual display device 110c, in which there are a two-overlapping area in which two individual display devices 110 overlap with each other and a four-overlapping area in which four individual display devices 110 all overlap with each other.

In embodiments of the present disclosure, the plurality of individual display devices 110 can be separable.

In embodiments of the present disclosure, the large-area display device 100 can include a plurality of individual display devices 110 including the first individual display device 110a and the second individual display device 110c, and the driving unit DU can include a upper left pixel Plu, a upper right pixel Pru, a lower left pixel Pld, and a lower right pixel Prd, and the plurality of individual display devices 110 can include a upper left individual display device 110a positioned at an upper left corner, a upper right individual display device 110b positioned at an upper right corner, a lower left individual display device 110c positioned at a lower left corner, and a lower right individual display device 110d positioned at a lower right corner, and the upper left individual display device 110a, the upper right individual display device 110b, the lower left individual display device 110c, and the lower right individual display device 110d can overlap each other.

In embodiments of the present disclosure, while the upper left individual display device 110a among the overlapping individual display devices 110 is positioned at the bottom, the upper left pixel Plu can emit light in the driving unit DU.

In embodiments of the present disclosure, while the upper right individual display device 110b among the overlapping individual display devices 110 is positioned at the bottom, the upper right pixel Pru can emit light in the driving unit DU.

In embodiments of the present disclosure, while the lower left individual display device 110c among the overlapping individual display devices 110 is positioned at the bottom, the lower left pixel Pld can emit light in the driving unit DU.

In embodiments of the present disclosure, while the lower right individual display device 110d among the overlapping individual display devices 110 is positioned at the bottom, the lower right pixel Prd can emit light in the driving unit DU.

In embodiments of the present disclosure, the narrow bezel positioned in the overlapping area can include an inclined surface 1210.

In embodiments of the present disclosure, the first individual display device 110a and/or the second individual display device 110c can include a guide rail 1240 positioned at a rear side. In other word, the first individual display device 110a can include a first guide rail 1240 positioned at a rear side of the first individual display device 110a, and/or the second individual display device 110c can include a second guide rail 1240 positioned at a rear side of the second individual display device 110c.

In embodiments of the present disclosure, the large-area display device 100 can include a plurality of individual display devices 110 including the first individual display device 110a and the second individual display device 110c, in which the plurality of individual display devices 110 can be arranged in a matrix manner including two or more rows and two or more columns.

In embodiments of the present disclosure, individual display devices 110 positioned at both ends of one row and both ends of one column can have different areas AA11-AA43 of a display area viewed from the outside.

Embodiments of the present disclosure can provide a large-area display device driving system 1800 including a large-area display device 100 in which a plurality of detachable individual display devices 110 are disposed to be overlapped with each other, an individual display device position adjusting member 1400 configured to fix a position of each of the plurality of individual display devices 110, and a horizontal frame 1730 on which the individual display device position adjusting member 1400 is mounted.

In embodiments of the present disclosure, each of the plurality of individual display devices 110 can include a guide rail 1240 located on the rear side, in which the individual display device position adjusting member 1400 can be coupled to the guide rail 1240.

In embodiments of the present disclosure, the individual display device position adjusting member 1400 can be horizontally movable while being mounted on the horizontal frame 1730.

In embodiments of the present disclosure, each of the plurality of individual display devices 110 can include a display area AA in which a driving unit DU including two or more pixels P is positioned, and a non-display area NA in which at least one bezel having a first width NA1 is positioned around the display area AA. Among the pixels P included in the driving unit DU, only one pixel P can emit light and the other pixels P that are covered up by at least one other individual display device 110 may not emit light, and an distance between adjacent light-emitting pixels P in two different individual display devices 110 can be greater than or equal to the first width NA1.

In embodiments of the present disclosure, the plurality of individual display devices 110 can include a first individual display device 110a and a second individual display device 110c disposed to overlap each other in an overlapping area, in which the first individual display device 110a can be driven so that pixels P located in the overlapping area among two or more pixels P do not display an image, in which the second individual display device 110c can drive pixels P located in the overlapping area among two or more pixels P to display an image.

In embodiments of the present disclosure, pixels P emitting light in a driving unit DU can be different according to an order in which the plurality of individual display devices 110 are overlapped.

The above description has been presented to enable a person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A large-area display device comprising:
a first individual display device including a plurality of first pixels;
a second individual display device including a plurality of second pixels and partially overlapping with the first individual display device in an overlapping area; and
an integrated controller configured to:
divide the plurality of first pixels of the first individual display device into a plurality of first driving units of pixels, each first driving unit including at least two adjacent first pixels, and
divide the plurality of second pixels of the second individual display device into a plurality of second driving units of pixels, each second driving unit including at least two adjacent second pixels,
wherein the second individual display device partially overlaps a row or column of the first driving units of pixels included in the first individual display device, such that an overlapped first set of first pixels in the row or column of the first driving units is overlapped by the second individual display device and a non-overlapped second set of first pixels in the row or column of the first driving units is not overlapped by the second individual display device, and
wherein the integrated controller is further configured to control the overlapped first set of first pixels not to emit light and control only one first pixel of the non-overlapped second set of first pixels to emit light.

2. The large-area display device of claim 1, wherein the second individual display device includes a narrow bezel of a first width, and at least a portion of the narrow bezel overlaps with the first individual display device, and wherein a distance between two pixels displaying an image in adjacent driving units is greater than or equal to the first width.

3. The large-area display device of claim 2, wherein the narrow bezel is positioned to overlap a pixel which does not display an image in the driving unit.

4. The large-area display device of claim 2, wherein the narrow bezel positioned in the overlapping area includes an inclined surface.

5. The large-area display device of claim 4, wherein the first individual display device includes a first guide rail positioned at a rear side of the first individual display device, or the second individual display device includes a second guide rail positioned at a rear side of the second individual display device.

6. The large-area display device of claim 4, wherein the large-area display device include a plurality of individual display devices configured to be separable from each other.

7. The large-area display device of claim 1, wherein the large-area display device includes a plurality of individual display devices including at least the first individual display device and the second individual display device, wherein each of the first and second driving units of pixels include an upper left pixel, an upper right pixel, a lower left pixel, and a lower right pixel, wherein the plurality of individual display devices includes an upper left individual display device positioned at an upper left corner of the large-area display device, an upper right individual display device positioned at an upper right corner of the large-area display device, a lower left individual display device positioned at a lower left corner of the large-area display device, and a lower right individual display device positioned at a lower right corner of the large-area display device, and wherein the upper left individual display device, the upper right individual display device, the lower left individual display device, and the lower right individual display device overlap each other.

8. The large-area display device of claim 7, wherein the upper left individual display device is positioned at a bottom of the large-area display device, and the upper left pixel of the upper left individual display device is configured to emit light and is not overlapped by any of the upper right individual display device, the lower left individual display device and the lower right individual display device.

9. The large-area display device of claim 7, wherein the upper right individual display device among the overlapping individual display devices is positioned at a bottom of the large-area display device, and the upper right pixel of the upper right individual display device is configured to emit light and is not overlapped by any of the upper left individual display device, the lower left individual display device and the lower right individual display device.

10. The large-area display device of claim 7, wherein the lower left individual display device among the overlapping individual display devices is positioned at a bottom of the large-area display device, and the lower left pixel of the lower left individual display device is configured to emit light and is not overlapped by any of the upper right individual display device, the upper left individual display device and the lower right individual display device.

11. The large-area display device of claim 7, wherein the lower right individual display device among the overlapping individual display devices is positioned at a bottom of the large-area display device, and the lower right pixel of the lower right individual display device is configured to emit light and is not overlapped by any of the upper right individual display device, the upper left individual display device and the lower left individual display device.

12. The large-area display device of claim 1, wherein the large-area display device includes a plurality of individual display devices including the first individual display device and the second individual display device, a third individual display device and a fourth individual display device, and wherein the large-area display device includes a two-overlapping area in which two of the first through fourth individual display devices overlap with each other and a four-overlapping area in which the first, second, third and fourth individual display devices overlap with each other.

13. The large-area display device of claim 1, wherein the large-area display device includes a plurality of individual display devices including the first individual display device and the second individual display device, and wherein the plurality of individual display devices are arranged in a matrix manner including two or more rows and two or more columns.

14. The large-area display device of claim 13, wherein individual display devices among the plurality of individual display devices positioned at opposite ends of one row or opposite ends of one column have different display area sizes viewed from an outside of the large-area display device.

15. The large-area display device of claim 1, wherein each of the first driving unit and the second driving unit includes an upper left corner pixel, an upper right corner pixel, a lower left corner pixel and a lower right corner pixel.

16. The large-area display device of claim 15, wherein the integrated controller is further configured to drive only the upper left corner pixel of the first individual display device with the second individual display device being overlapped onto the upper right corner pixel and the lower right corner pixel of the first individual display device.

17. The large-area display device of claim 15, wherein the integrated controller is further configured to drive only the upper right corner pixel of the second individual display device with third individual display device being overlapped onto the upper left corner pixel and the lower left corner pixel of the second individual display device.

18. A large-area display device driving system comprising:
a large-area display device including a plurality of detachable individual display devices partially overlapping with each other;
an individual display device position adjusting member configured to fix a position of one or more of the plurality of individual display devices; and
a horizontal frame coupled to the individual display device position adjusting member,
wherein the plurality of detachable individual display devices overlapping with each other comprise:
a first individual display device including a plurality of first pixels;
a second individual display device including a plurality of second pixels and partially overlapping with the first individual display device in an overlapping area; and
an integrated controller configured to:
divide the plurality of first pixels of the first individual display device into a plurality of first driving units of pixels, each first driving unit including at least two adjacent first pixels, and divide the plurality of second pixels of the second individual display device into a plurality of second driving units of pixels, each second driving unit including at least two adjacent second pixels, wherein the second individual display device partially overlaps a row or column of the first driving units of pixels included in the first individual display device, such that an overlapped first set of first pixels in the row or column of the first driving units is overlapped by the second individual display device and a non-overlapped second set of first pixels in the row or column of the first driving units is not overlapped by the second individual display device, and wherein the integrated controller is further configured to control the overlapped first set of first pixels not to emit light and control only one first pixel of the non-overlapped second set of first pixels to emit light.

19. The large-area display device driving system of claim 18, wherein each of the plurality of individual display devices includes a guide rail located on a rear side of the corresponding individual display device, and wherein the individual display device position adjusting member is coupled to the guide rail of each of the plurality of individual display devices.

20. The large-area display device driving system of claim 18, wherein the individual display device position adjusting member is configured to be horizontally movable while being mounted on the horizontal frame.

21. The large-area display device driving system of claim 18, wherein the integrated controller is further configured to determine a number of first pixels included in the first driving units of pixels, and determine a number of second pixels included in the second driving units of pixels, according to an order in which the plurality of individual display devices are overlapped with each other.

* * * * *